(12) United States Patent
Vaid et al.

(10) Patent No.: US 12,513,517 B2
(45) Date of Patent: Dec. 30, 2025

(54) CROSS PLATFORM CREDENTIAL SHARING

(71) Applicant: Apple Inc., Cupertino, CA (US)

(72) Inventors: Yousuf H. Vaid, Fremont, CA (US);
Christopher Sharp, Morgan Hill, CA (US); Matthew C. Byington, Sunnyvale, CA (US); Sunil Nair, Fremont, CA (US); Dmitry Vinokurov, Mountain View, CA (US); Brandon Leventhal, San Francisco, CA (US); Alex Pelletier, Sunnyvale, CA (US); Casey Astiz, Los Altos, CA (US)

(73) Assignee: Apple Inc., Cupertino, CA (US)

(*) Notice: Subject to any disclaimer, the term of this patent is extended or adjusted under 35 U.S.C. 154(b) by 100 days.

(21) Appl. No.: 17/952,126

(22) Filed: Sep. 23, 2022

(65) Prior Publication Data
US 2023/0096370 A1    Mar. 30, 2023

Related U.S. Application Data

(60) Provisional application No. 63/408,815, filed on Sep. 21, 2022, provisional application No. 63/248,391, filed on Sep. 24, 2021.

(51) Int. Cl.
*H04W 12/06*    (2021.01)
*H04L 9/08*    (2006.01)
(Continued)

(52) U.S. Cl.
CPC ............ *H04W 12/06* (2013.01); *H04L 9/08* (2013.01); *H04L 63/0428* (2013.01); *H04L 63/08* (2013.01); *H04L 63/0884* (2013.01); *H04L 63/10* (2013.01); *H04L 63/20* (2013.01); *H04W 12/033* (2021.01)

(58) Field of Classification Search
CPC .... G06F 21/45; G06F 21/602; G06F 21/6209; G06F 21/78; H04L 63/0428; H04L 63/062; H04L 63/08; H04L 63/0884; H04L 63/10; H04L 63/20; H04W 12/03; H04W 12/033;
(Continued)

(56) References Cited

U.S. PATENT DOCUMENTS 8,726,369 B1    5/2014    Emigh
8,806,567 B1*    8/2014    Venable, Sr. ......... H04W 12/06
                                                                340/8.1
(Continued)

FOREIGN PATENT DOCUMENTS

CN          105636030 A      6/2016

OTHER PUBLICATIONS

Application No. PCT/US2022/044621, International Search Report and Written Opinion, Mailed on Jan. 11, 2023, 15 pages.
(Continued)

*Primary Examiner* — Greg C Bengzon
(74) *Attorney, Agent, or Firm* — Kilpatrick Townsend & Stockton LLP

(57) ABSTRACT

The present application relates to devices and components including apparatus, systems, and methods to share a credential for accessing a secured entity between an origination device and a recipient device. In some embodiments, the sharing may be cross platform where the recipient device executes a different platform than the origination device.

20 Claims, 20 Drawing Sheets

(51) Int. Cl.
*H04L 9/40* (2022.01)
*H04W 12/033* (2021.01)

(58) Field of Classification Search
CPC . H04W 12/047; H04W 12/06; H04W 12/068; H04W 12/108
See application file for complete search history.

(56) References Cited

U.S. PATENT DOCUMENTS

| | | | |
|---|---|---|---|
| 8,943,187 B1* | 1/2015 | Saylor | G07C 9/00857 709/225 |
| 9,002,864 B1* | 4/2015 | Payne | G06F 16/955 707/756 |
| 9,009,805 B1 | 4/2015 | Kirkby et al. | |
| 9,444,805 B1* | 9/2016 | Saylor | H04L 63/08 |
| 9,608,970 B1 | 3/2017 | Gehret et al. | |
| 9,666,000 B1* | 5/2017 | Schoenfelder | G07C 9/257 |
| 9,723,003 B1* | 8/2017 | McClintock | H04L 63/10 |
| 9,923,879 B1* | 3/2018 | Ziraknejad | H04L 63/107 |
| 9,923,927 B1* | 3/2018 | McClintock | H04L 63/0846 |
| 9,973,481 B1 | 5/2018 | Sharifi Mehr | |
| 9,990,786 B1* | 6/2018 | Ziraknejad | G06F 21/45 |
| 10,015,173 B1 | 7/2018 | Efstathopoulos | |
| 10,129,299 B1* | 11/2018 | McClintock | H04L 63/0869 |
| 10,257,179 B1* | 4/2019 | Saylor | H04W 12/068 |
| 10,701,067 B1* | 6/2020 | Ziraknejad | H04W 12/63 |
| 10,904,186 B1 | 1/2021 | Everton et al. | |
| 11,010,485 B1* | 5/2021 | Devlin | H04L 9/3247 |
| 11,381,405 B1* | 7/2022 | Sundaresan | H04L 9/3231 |
| 11,683,159 B2 | 6/2023 | Lidzborski et al. | |
| 2002/0067832 A1 | 6/2002 | Jablon | |
| 2003/0018901 A1 | 1/2003 | Burritt et al. | |
| 2004/0261093 A1 | 12/2004 | Rebaud et al. | |
| 2010/0299340 A1 | 11/2010 | Murthy et al. | |
| 2011/0119155 A1 | 5/2011 | Hammad et al. | |
| 2011/0173337 A1 | 7/2011 | Walsh et al. | |
| 2011/0173684 A1 | 7/2011 | Hurry et al. | |
| 2011/0214165 A1 | 9/2011 | Jeffreys et al. | |
| 2012/0158922 A1 | 6/2012 | Aggarwal et al. | |
| 2012/0330781 A1 | 12/2012 | Borrero | |
| 2012/0331518 A1 | 12/2012 | Lee | |
| 2013/0298211 A1 | 11/2013 | M'raihi et al. | |
| 2014/0082718 A1 | 3/2014 | Yu et al. | |
| 2014/0129448 A1 | 5/2014 | Aiglstorfer | |
| 2014/0208112 A1 | 7/2014 | McDonald et al. | |
| 2014/0283136 A1 | 9/2014 | Dougherty et al. | |
| 2014/0331297 A1* | 11/2014 | Innes | H04L 63/0884 726/7 |
| 2015/0113283 A1 | 4/2015 | Corella et al. | |
| 2015/0381588 A1 | 12/2015 | Huang et al. | |
| 2016/0072807 A1 | 3/2016 | Park | |
| 2016/0234186 A1* | 8/2016 | Leblond | H04L 67/34 |
| 2016/0260031 A1* | 9/2016 | Pace | G06Q 20/1235 |
| 2016/0359629 A1* | 12/2016 | Nadathur | H04L 9/14 |
| 2017/0041147 A1* | 2/2017 | Krahn | H04L 9/0877 |
| 2017/0063840 A1* | 3/2017 | Krishnaiah | H04L 63/0861 |
| 2017/0169688 A1* | 6/2017 | Britt | G08B 25/10 |
| 2017/0188213 A1* | 6/2017 | Nirantar | H04L 67/564 |
| 2017/0264654 A1 | 9/2017 | Hardt et al. | |
| 2018/0005143 A1* | 1/2018 | Camargo | H04W 4/80 |
| 2018/0103026 A1 | 4/2018 | Taralika et al. | |
| 2018/0165781 A1* | 6/2018 | Rodriguez | G06F 21/34 |
| 2019/0188636 A1 | 6/2019 | Endo et al. | |
| 2019/0197231 A1* | 6/2019 | Meier | H04L 63/0407 |
| 2019/0286832 A1 | 9/2019 | Szeto et al. | |
| 2019/0319940 A1* | 10/2019 | Hamel | G06F 21/64 |
| 2019/0347640 A1 | 11/2019 | Runyan et al. | |
| 2020/0052905 A1 | 2/2020 | Mathias et al. | |
| 2020/0100108 A1* | 3/2020 | Everson | H04L 9/0825 |
| 2020/0242590 A1* | 7/2020 | Sarjaz | H04L 9/0847 |
| 2021/0006933 A1* | 1/2021 | Dean | G16Y 40/10 |
| 2021/0097795 A1* | 4/2021 | Manchovski | H04L 63/108 |
| 2021/0099449 A1 | 4/2021 | Frederick et al. | |
| 2021/0165898 A1 | 6/2021 | Weiss et al. | |
| 2021/0167954 A1 | 6/2021 | Weiss et al. | |
| 2021/0374232 A1* | 12/2021 | Bursell | G06F 21/50 |
| 2021/0374233 A1* | 12/2021 | Bursell | H04L 9/3242 |
| 2021/0374234 A1* | 12/2021 | Bursell | H04L 9/085 |
| 2022/0021684 A1* | 1/2022 | Mensah | H04L 63/105 |
| 2022/0094668 A1 | 3/2022 | Vedula et al. | |
| 2022/0141215 A1 | 5/2022 | Kwok et al. | |
| 2022/0376926 A1 | 11/2022 | Wang et al. | |
| 2022/0385467 A1 | 12/2022 | Ramadasse et al. | |
| 2023/0096370 A1 | 3/2023 | Vaid et al. | |

OTHER PUBLICATIONS

Vinokurov et al., "Secure Credential Transfer", Available Online at: https://datatracker.ietf.org/doc/html/draft-secure-credential-transfer-00, Oct. 21, 2021, 18 pages.

U.S. Appl. No. 17/952,091, Non-Final Office Action, Feb. 26, 2025, 45 pages.

U.S. Appl. No. 17/952,118, Non-Final Office Action, Jan. 17, 2025, 19 pages.

Final Office Action issued in U.S. Appl. No. 17/952,091, dated Oct. 28, 2025 in 49 pages.

* cited by examiner

CROSS PLATFORM CREDENTIAL SHARING

CROSS-REFERENCE TO RELATED APPLICATIONS

This application claims priority to U.S. Provisional Patent Application No. 63/248,391, entitled "CROSS PLATFORM CREDENTIAL SHARING," filed on Sep. 24, 2021, and U.S. Provisional Patent Application No. 63/408,815, entitled "CROSS PLATFORM CREDENTIAL SHARING," filed on Sep. 21, 2022. This application is also related to U.S. Non-Provisional patent application Ser. No. 17/952,091, entitled "CROSS PLATFORM CREDENTIAL SHARING," Sep. 23, 2022, and U.S. Non-Provisional patent application Ser. No. 17/952,118, entitled "CROSS PLATFORM CREDENTIAL SHARING," filed on Sep. 23, 2022 concurrently herewith. The disclosure of all these applications, both provisional and non-provisional, are incorporated by reference herein in their entireties for all purposes.

BACKGROUND

With the development of wireless communication, secured entities (such as vehicles, buildings, rooms, electronic storage locations and/or other secure physical entities or secure computer entities) can provide access through wireless communication with a device. For example, a secured entity may detect a device having a credential being moved within a proximity of the secured entity or the credential being activated by the device and provide access to the secured entity.

DETAILED DESCRIPTION

Figure 1:
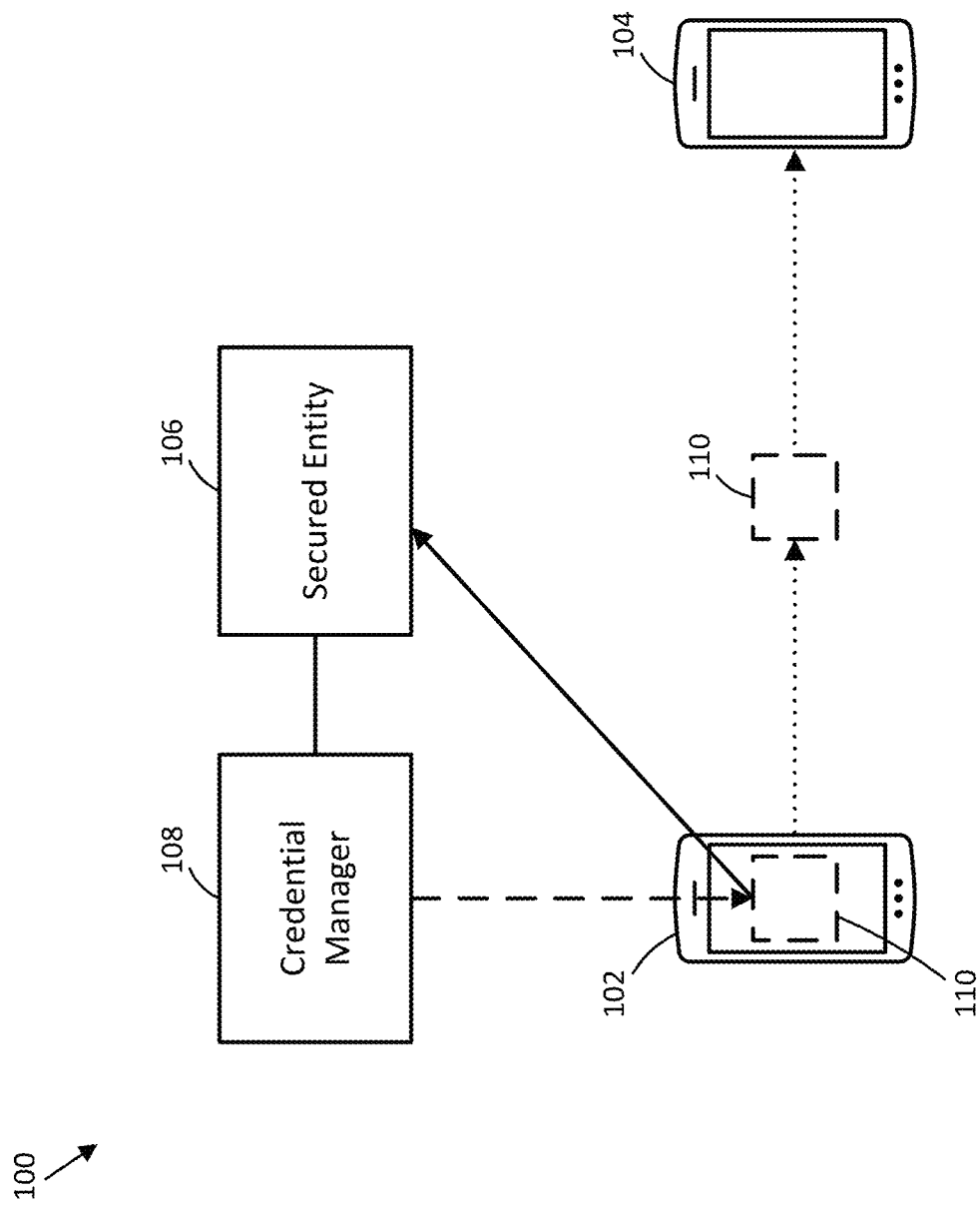
FIG. 1 illustrates an example credential arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Embodiments described herein may relate to accessing a secured entity via a credential saved on device. As one example, a user may have a credential stored on their phone that allows the user to unlock a door of their house. For example, the user may unlock the door by moving their phone within a proximity of a lock on the door of the house or by interacting with their phone to indicate that the user wants to unlock the lock of the door. To provide security to the user in some instances, the credential for unlocking the door will be prevented from being directly copied from the phone. For example, the credential may need to be generated by a credential manager that provides the credential to the phone.

However, a user may want to allow another user to be able to unlock the door on their house. For example, the user may want to be able to allow a house guest to unlock and lock the door on their house so the house guest can come and go as they please. To allow the house guest to unlock the door, the user may want to share the credential with the house guest that will allow the guest to unlock the door. Although, the phone may not be able to generate copies of the credential or providing the credential stored on their phone.

In embodiments described herein, the user may request that the credential manager generate another copy of the credential for the house guest. The credential manager may generate another copy of the credential for use by the house guest. A phone of the house guest may retrieve the credential from the credential manager. The credential manager may authenticate the house guest to verify that the house guest is authorized to receive the credential before providing the credential to the phone of the house guest. Once the phone of the house guest receives the credential, the house guest may be able to unlock the door using their phone.

Embodiments described herein may include sharing of a credential by an origination device with a recipient device. In particular, a credential for access to a secured entity may be provisioned to the origination device, such as being provisioned by a credential manager. The origination device may be unable to clone or create a copy of the credential for sharing with the recipient device, such as when the credential is unclonable and/or the recipient device is executing a different platform than the origination device. The origination device may communicate with a relay server to store a token to be retrieved by the recipient device. The recipient device may utilize the token to obtain the credential to be used for accessing a secured entity associated with the credential.

For example, a user of the origination device, having the credential stored thereon, may request that a credential manager for the credential to generate the credential for use by the origination device. The credential manager may generate another of the credential for use by the recipient device. The origination device may then generate a password and provide the password to the recipient device. The recipient may utilize the password to retrieve the credential from the credential manager.

FIG. 1 illustrates an example credential arrangement 100 in accordance with some embodiments. The credential arrangement 100 shows a portion of the entities that may be utilized to share a credential between an origination device 102 and a recipient device 104. The credential arrangement 100 illustrates example high level concepts of credential sharing between the origination device 102 and the recipient device 104, where further description below provides further details of the credential sharing.

Figure 12:
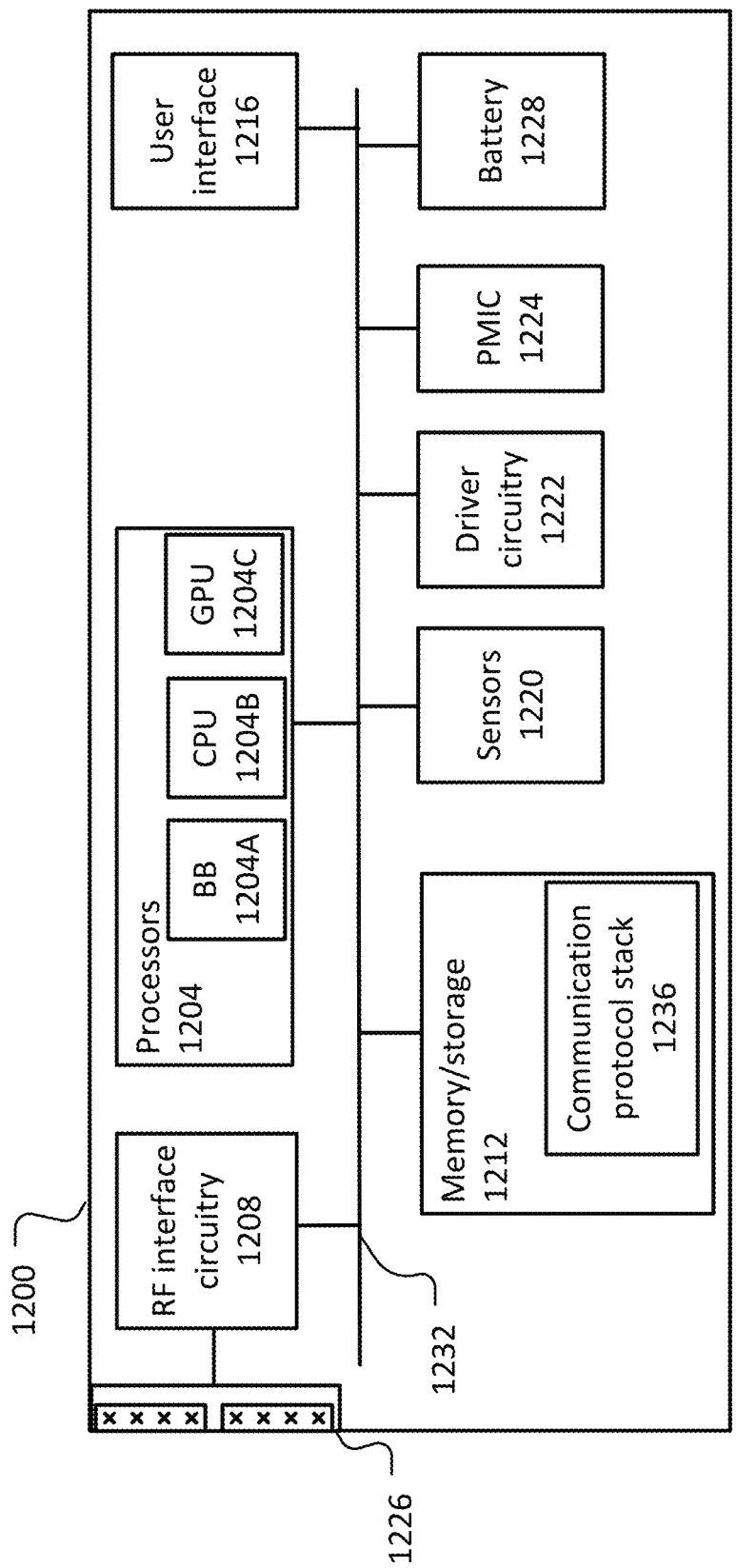
FIG. 12 illustrates an example user equipment in accordance with some embodiments.

The credential arrangement 100 may include the origination device 102. The origination device 102 may include one or more of the features of the user equipment (UE) 1200 (FIG. 12). The origination device 102 may include wireless circuitry that allows the origination device 102 to wirelessly access secured entities. For example, the origination device 102 may provide access to a secured entity when the origination device 102 is moved within a proximity of the secured entity or user interaction with the origination device 102 indicates that the origination device 102 is to provide access to the secured entity.

The credential arrangement 100 may include a secured entity 106. The secured entity 106 may include a vehicle, a building, a room, an electronic storage location, and/or another secure physical entity or secure computer entity. The secured entity 106 may be inaccessible, or may have some portion that is inaccessible, without a credential. The secured entity 106, or some portion thereof, may be wirelessly enabled for wireless communication with other devices. The secured entity 106 may detect a credential associated with the secured entity 106 received from another device (such as the origination device 102) and may provide access to the secured entity 106, or some portion thereof. The credential may comprise an electronic credential that can be used for authenticating that a user is authorized to access the secured entity 106.

The credential arrangement 100 may include a credential manager 108 (which also may be referred to as a credential authority). The credential manager 108 may generate, store, and/or assign credentials for one or more secured entities. In the illustrated embodiment, the credential manager 108 may be associated with the secured entity 106 and may generate, store, and/or assign credentials for the secured entity 106. For example, the credential manager 108 may be communicatively coupled to the secured entity 106 and may provide the secured entity 106 with indications of credentials for which the secured entity 106 is to provide access. The credentials generated, stored, and/or assigned by the credential manager 108 may provide for access to the secured entity 106 when detected by the secured entity 106.

The credential manager 108 may generate one or more credentials for the secured entity 106 and may provide the credentials to one or more other devices for providing access to the secured entity 106. In the illustrated embodiment, the credential manager 108 may have generated a credential 110 for accessing the secured entity 106. Further, the credential manager 108 may have assigned the credential 110 to the origination device 102 to provide the origination device 102 with access to the secured entity 106. Assigning the credential 110 may include the credential manager 108 providing the credential 110 to the origination device 102 for storage on the origination device 102. The credential manager 108 may establish a wireless connection and/or a network connection with the origination device 102 to provide the credential 110 to the origination device 102 in some embodiments. The credential manager 108 may further indicate the credential 110 to the secured entity 106, thereby indicating to the secured entity 106 that the secured entity 106 is to allow access when the credential 110 is detected by the secured entity 106. In some embodiments (such as when a user of the origination device 102 owns the secured entity 106), the credential manager 108 may be implemented within the origination device 102.

The credential 110 may comprise an unclonable credential in some embodiments. For example, the credential 110 may comprise an unclonable digital key. The credential 110 may be tied to the particular device to which the credential 110 is assigned (the origination device 102 in the illustrated embodiment) in some embodiments such that other devices may be unable to utilize the credential to access the secured entity 106. In some embodiments, the credential 110 may be designed such that if a device tries to copy the credential 110, the copy of the credential 110 will not be the same as the credential 110. Accordingly, the origination device 102 may be unable to produce a copy of the credential 110 to provide to other devices for providing access to the secured entity 106. Therefore, the origination device 102 may be unable to directly assign the credential 110 to other devices for providing access to the secured entity 106.

The credential arrangement 100 may further include the recipient device 104. The recipient device 104 may include one or more of the features of the UE 1200 (FIG. 12). The recipient device 104 may include wireless circuitry that allows the recipient device 104 to communicate with one or more other devices. In some embodiments, the recipient device 104 may be executing a different platform from the origination device 102. For example, the origination device 102 may be executing a first operating system (such as operating systems iOS, Android, Windows, MacOS, Linux, or other operating systems) while the recipient device 104 is operating a second operating system that is different from the first operating system. Due to the origination device 102 and the recipient device 104 executing different operating systems, communication between the origination device 102 and the recipient device 104 may include translation of the communication to the standards of the device receiving the communication.

Unlike the origination device 102, the recipient device 104 may not have been originally assigned the credential 110 from the credential manager 108. However, there may be times at which a user of the origination device 102 may wish to share the credential 110 with the recipient device 104 to allow the recipient device 104 to provide access to the secured entity 106. The origination device 102 may be unable to share the credential 110 directly with the recipient device 104 due to the credential being unclonable and/or the origination device 102 and the recipient device 104 executing different platforms. Therefore, the approaches described further throughout this disclosure for sharing the credential may be implemented for the origination device 102 to share the credential 110 with the recipient device 104. Once the credential 110 is shared with the recipient device 104 in accordance with the approaches, the recipient device 104 may provide access to the secured entity 106, such as when the recipient device 104 is moved within a proximity of the secured entity 106 or user interaction with the recipient device 104 indicates that the recipient device 104 is to provide access to the secured entity 106.

Figure 2:
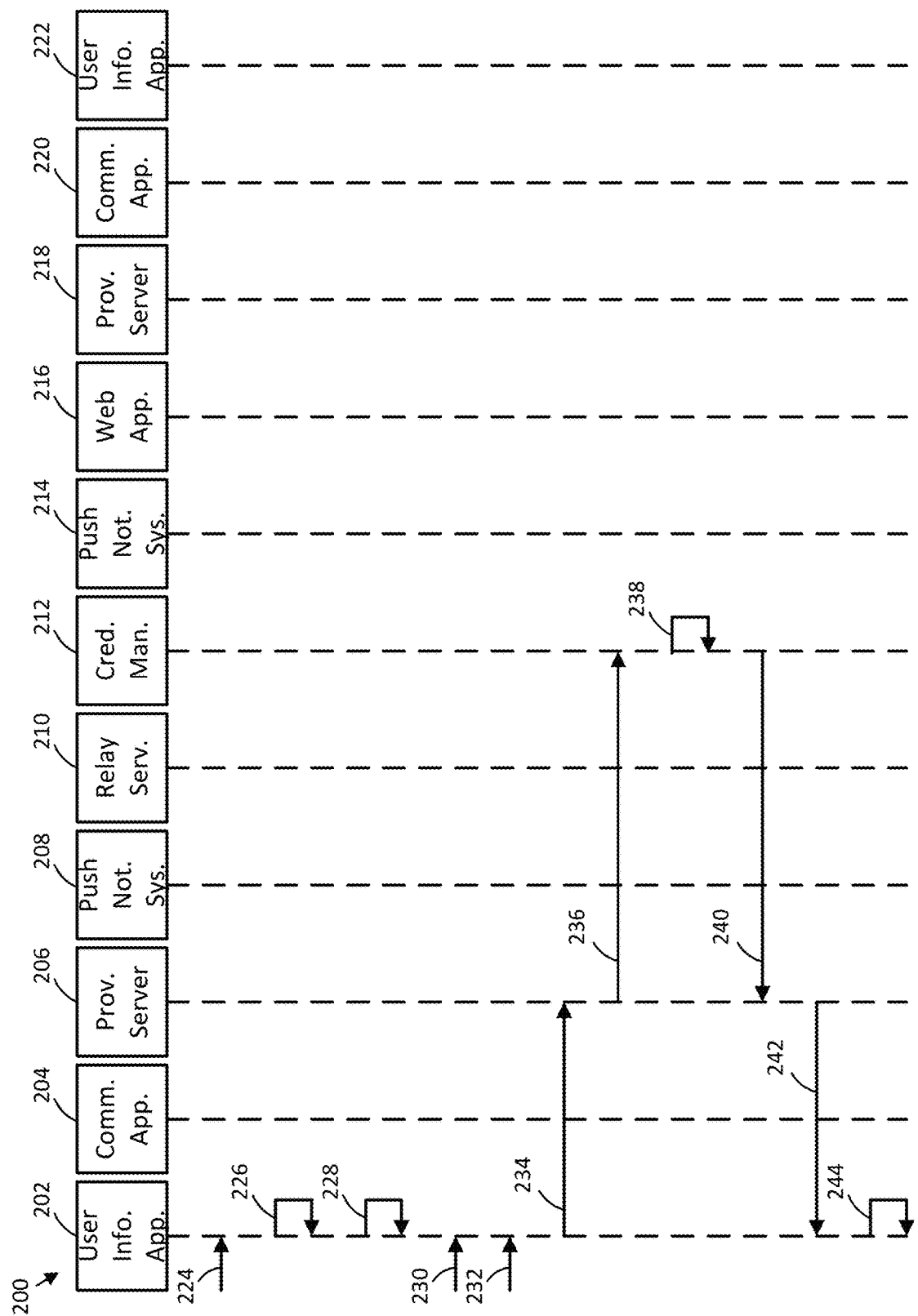
FIG. 2 illustrates a first portion of an example signal flow for sharing a credential in accordance with some embodiments.

FIG. 2 illustrates a first portion of an example signal flow 200 for sharing a credential in accordance with some embodiments. In particular, the signal flow 200 indicates signals and operations that may be performed for sharing a credential between a first device (referred to as "origination device") and a second device (referred to as "recipient device"). Some of the signals and/or operations illustrated may be implemented in the alternative, as described further herein. Further, it should be understood that the signals and/or operations, or some portions thereof, may be performed concurrently and/or some of the signals and/or operations may be omitted in embodiments.

The signal flow 200 may be implemented among multiple entities that facilitate the sharing of the credential between the origination device and the recipient device. For example, the signal flow 200 may include a user information application 202 being executed by the origination device. In some embodiments, the user information application 202 may be a wallet application, where the wallet application may retrieve account information and/or balance information from a credential manager and represent the account information and/or balance information on the origination device. The origination device may be, or may include one or more of the features of, the origination device 102 (FIG. 1). The user information application 202 may store one or more credentials that allow the origination device to access a secured entity. For example, the user information application 202 may have been assigned, and have stored, a credential (such as the credential 110 (FIG. 1)). The credential may provide the origination device with access to a secured entity (such as the secured entity 106 (FIG. 1)). The origination device may share the credential with the recipient device via the signals and operations illustrated in the signal flow 200.

The signal flow 200 may further include a communication application 204. The communication application 204 may comprise an application executed on the origination device that can be utilized by the origination device to communicate with another device. For example, the communication application 204 may comprise a text messaging application in some embodiments. Some examples of the communication application 204 may include short message service (SMS), multimedia messaging service (MMS), WhatsApp, Signal, Telegram, iMessage, Google Messages, and other messaging services. The origination device may utilize the communication application 204 to communicate with communication applications executing on other devices.

The signal flow 200 may include a provisioning server 206. The provisioning server 206 may be associated with the origination device and may be responsible for provisioning credentials to the user information application 202 of the origination device. For example, the provisioning server 206 may have provisioned the credential to the user information application 202 for accessing the secured entity. In some embodiments, the provisioning server 206 may comprise an Android Broker, an Apple Broker, or another provisioning server.

The signal flow 200 may include a push notification system 208. The push notification system 208 may be utilized for issuing pushes for the origination device and/or issuing pushes between the origination device and one or more other devices. For example, the push notification system 208 may provide messages to the origination device that can cause the origination device to perform an operation, such as display a user interface pop up in a heads-up manner on the origination device in response to the origination device detecting the messages and/or perform another operation.

The signal flow 200 may include a relay server 210. The relay server 210 may be associated with the origination device and may facilitate the sharing of credentials with devices executing different platforms. The relay server 210 may receive data from the origination device and make the data available to devices executing other platforms. For example, the relay server 210 may receive the data from the origination device and may convert the data to a format for a different platform requesting the data. For example, the relay server 210 may receive a token from the user information application 202 and convert the token for a different platform when another device retrieves the token.

The signal flow 200 may include a credential manager 212. The credential manager 212 may include one or more of the features of the credential manager 108 (FIG. 1). The credential manager 212 may be associated with one or more secured entities (such as the secured entity 106) and may generate, store, and/or assign one or more credentials (such as the credential 110 (FIG. 1)) for the secured entities. For example, the credential manager 212 may have assigned the credential to the user information application 202 of the origination device that is to be shared with the recipient device via the signals and/or operations of the signal flow 200.

The signal flow 200 may include a push notification system 214. The push notification system 214 may be utilized for issuing pushes for the recipient device and/or issuing pushes between the recipient device and one or more other devices. The recipient device may be, or may include one or more of the features of, the recipient device 104 (FIG. 1). The push notification system 214 may provide messages to the recipient device that can cause the recipient device to perform an operation, such as display a user interface pop up in a heads-up manner on the recipient device in response to the recipient device detecting the messages and/or perform another operation.

The signal flow 200 may include a web application 216. The web application 216 may facilitate provisioning of credentials into a user information application 222 of the recipient device. For example, the web application 216 may communicate with the credential manager 212 to facilitate sharing the credential with the recipient device.

The signal flow 200 may include a provisioning server 218. The provisioning server 218 may be associated with the recipient device and may be responsible for provisioning credentials to the user information application 222 of the recipient device. In some embodiments, the provisioning server 218 may comprise an Android Broker, an Apple Broker, or another provisioning server. The recipient device may be executing a different platform than the origination device and the provisioning server 218 may be provisioning in accordance with the platform executed by the recipient device. For example, if the provisioning server 206 is an Android Broker, the provisioning server 218 may be an Apple Broker in some embodiments.

The signal flow 200 may include a communication application 220. The communication application 220 may comprise an application executed on the recipient device that can be utilized by the recipient device to communicate with another device. For example, the communication application 220 may comprise a text messaging application in some embodiments. Some examples of the communication application 220 may include short message service (SMS), multimedia messaging service (MMS), WhatsApp, Signal, Telegram, iMessage, Google Messages, and other messaging services. The recipient device may utilize the communication application 220 to communicate with communication applications executing on other devices.

The signal flow 200 may include a user information application 222 being executed by the recipient device. In some embodiments, the user information application 222 may be a wallet application, where the wallet application may retrieve account information and/or balance information from a credential manager and represent the account information and/or the balance information on the recipient device. The recipient device may be, or may include one or more of the features of, the recipient device 104. The recipient device may execute a different platform than the origination device. The user information application 222 may be a user information application for the platform executed by the recipient device, whereas the user information application 202 may be a user information application for the platform executed by the origination device. The user information application 222 may store one or more credentials that allow the recipient device to access a secured entity.

In 224, the user information application 202 of the origination device may detect a user interaction from a user of the origination device that indicates the user desires to share a credential. For example, the user information application 202 may be executed by the origination device and may present a user interface on a display of the origination device. The origination device may detect a user indication with the user interface displayed by the origination device that indicates the user desires to share a credential.

In 226, the user information application 202 may read shareable entitlements from the origination device. For example, the user information application 202 may determine credentials that are available in the user information application 202, which may be one or more of the credentials stored by the origination device. From the credentials, the user information application 202 may determine which of the credentials are shareable. For example, stored data associated with the credentials may indicate which of the credentials are shareable in some embodiments.

In 228, the user information application 202 may present indications of the shareable credentials to the user of the origination device. In particular, the user information application 202 may display a user interface on the display of the origination device that indicates the credentials available in the user information application 202 that are shareable. The user interface may allow the user to select one or more of the shareable credentials to be shared by the user information application 202.

In 230, the user information application 202 may detect a user interaction from the user that indicates which of the shareable credentials the user selects to share. For example, the user may interact with the user interface display by the user information application in 228 to indicate which of the displayed shareable credentials the user selects to share. The origination device may detect the user interaction and the user information application 202 may determine which credentials are to be shared based on the user interaction. In some embodiments, the user may further define limitations for sharing of the credentials. For example, the user may indicate a time period for which the sharing of the credentials is to remain valid, times of day and/or week that a device with which the credentials are being shared may utilize the credentials, a particular entity access point (for example, if a secured entity includes multiple entity access points (such as multiple doors), a particular entity access point (such as a certain door of the multiple doors) may be defined for providing access to the secured entity), or other limitations for the use of the credentials.

In 232, the user information application 202 may detect a user interaction from the user indicating that the sharing of the selected credentials is to be initiated. For example, the user may interact with a user interface displayed on the display of the origination device that indicates that the user information application 202 is to share the selected credentials. The user information application 202 may detect the user interaction and initiate the procedure for sharing the credentials.

234 through 244 and 302 (FIG. 3) may be performed in the alternative in different embodiments. For example, 234 through 244 may be performed in some instances and 302 may be performed in other instances. 234 through 244 may be performed in instances where the credential authority is located remote from the origination device, such as the credential manager 212 being implemented in a device separate from the origination device. 302 may be implemented in instances where the credential authority is implemented by the origination device.

In 234, the user information application 202 may transmit a sharing session request to the provisioning server 206. The sharing session request may request that a session be initiated for sharing the credentials selected in 230. The sharing session request may include authentication information for the origination device that may be utilized for authenticating the device for setting up the sharing session. In some embodiments, the authentication information may include fast identity online (FIDO) authentication information that can be utilized for authenticating the origination device. The sharing session request may further include entitlement information and/or serial number information related to the credential to be shared. For example, the entitlement information may indicate the credential and/or any limitations corresponding to the credential as may be defined in the selection in 230.

In 236, the provisioning server 206 may transmit a sharing session request to the credential manager 212. In particular, the provisioning server 206 may detect the sharing session request received from the user information application 202 in 234. The provisioning server 206 may utilize data included in the sharing session request received from the user information application 202 to generate a provisioning bundle identifier (ID). The provisioning server 206 may generate the provisioning bundle based on the serial number information received in the sharing session request received from the user information application 202, information related to the user information application 202, information related to the provisioning server 206, or some combination thereof. The provisioning server 206 may generate a sharing session request to be transmitted that includes the authentication information received from the user information application 202, the entitlement information received from the user information application 202, and/or the provisioning bundle. The provisioning server 206 may transmit the sharing session request generated by the provisioning server 206 to the credential manager 212.

In 238, the credential manager 212 may generate a token (which may be referred to as a "bearer token") and/or metadata corresponding to the credential to be shared. For example, the credential manager 212 may detect the sharing session request received from the provisioning server 206. The credential manager 212 may perform authentication of the origination device based on information included in the sharing session request received from the provisioning server 206. If the credential manager 212 fails to authenticate the origination device, the procedure of sharing the credential may be terminated. If the credential manager 212 authenticates the origination device, the credential manager 212 may generate the bearer token and/or the metadata based on information received in the sharing session request. The metadata may include provisioning information related to the platforms executed by the originating device and/or the recipient device, generate advanced encryption standard (AES) data (such as AES salt) and/or data for stateful sharing of the credential. Stateful sharing may include the origination device and the recipient device communicating to share the credential. The credential manager 212 may bind the bearer token and/or the metadata to the entitlement information received in the sharing session request. The credential manager 212 may allow the credential to be retrieved based on the bearer token by a single device. The credential manager 212 may further encrypt the bearer token and/or the metadata. The encryption may prevent one or more of the entities (such as the provisioning server 206, the relay server 210, the web application 216, and/or the provisioning server 218) from being able to read the bearer token and/or the metadata.

In 240, the credential manager 212 may transmit the encrypted bearer token and/or the metadata to the provisioning server 206. The credential manager 212 may transmit the encrypted bearer token and/or the metadata based on receiving the sharing session request received from the provisioning server 206.

In 242, the provisioning server 206 may transmit the encrypted bearer token and/or the metadata to the user information application 202 on the origination device. Due to the encrypting, one or more of the entities (such as the provisioning server 206, the relay server 210, the web application 216, and/or the provisioning server 218) may be unable to read the bearer token and/or the metadata. The provisioning server 206 may forward the encrypted bearer token and/or the metadata received from the credential manager 212 to the user information application 202.

In 244, the user information application 202 may decrypt the bearer token and/or the metadata received from the provisioning server 206. In particular, the user information application 202 may detect the encrypted bearer token and/or metadata received from the provisioning server 206. The user information application 202 may decrypt the encrypted bearer token and/or metadata received from the provisioning server 206.

Figure 3:
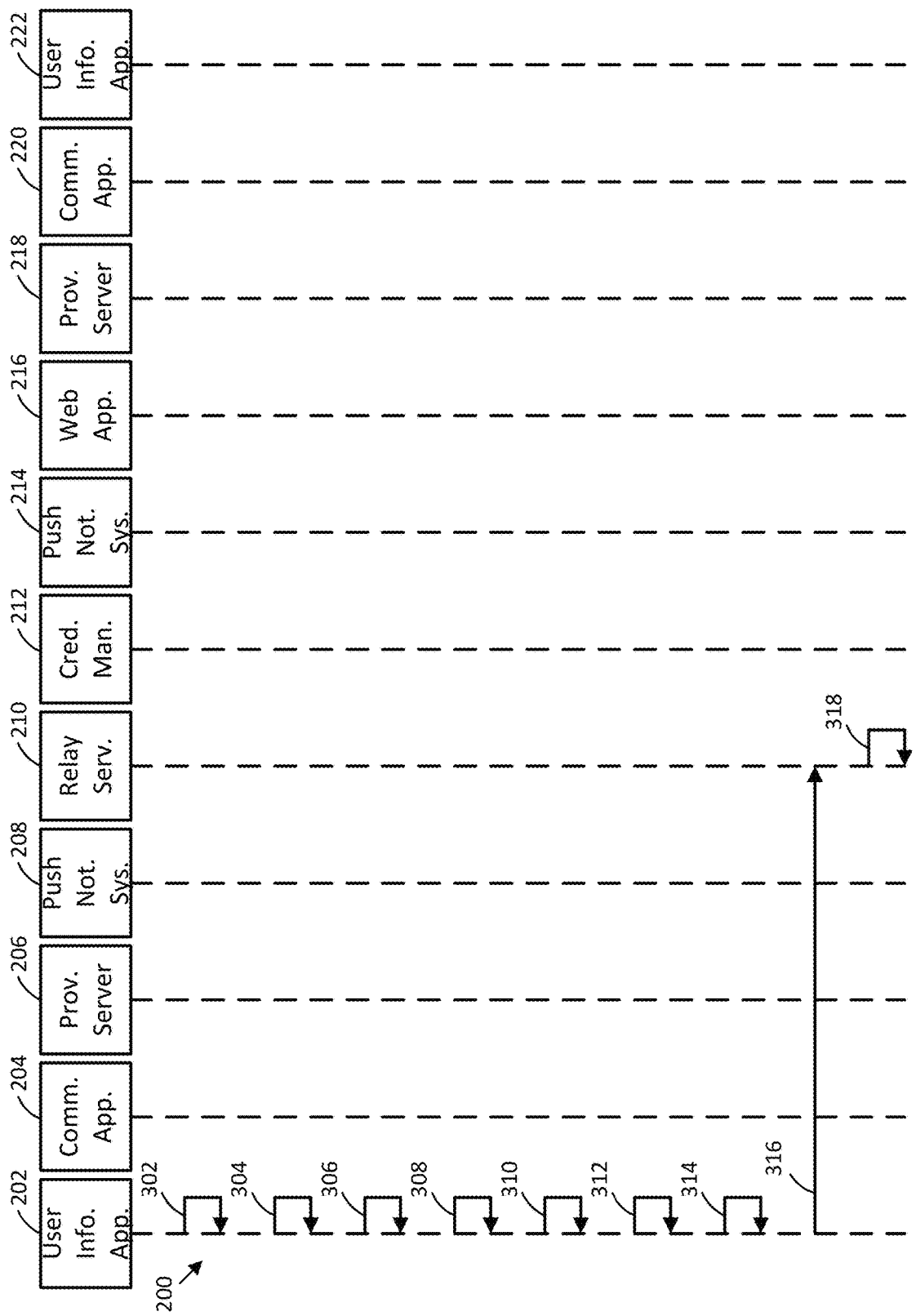
FIG. 3 illustrates a second portion of the example signal flow for sharing a credential in accordance with some embodiments.

FIG. 3 illustrates a second portion of the example signal flow 200 for sharing a credential in accordance with some embodiments. In the alternative to 234 through 244, 302 may be performed in other instances. In 302, the user information application 202 may generate a token (which may be referred to as a "bearer token") and/or metadata based on the indication to share the selected credentials. The bearer token and/or metadata may include one or more of the features of the bearer token and/or metadata described in relation to 238.

In 304, the user information application 202 may generate a password. The password may be utilized for retrieving the shared credential. For example, the origination device may provide the password to the recipient device, as described further throughout this disclosure, and the recipient device may utilize the password to retrieve the shared credential.

In 306, the user information application 202 may generate a mailbox ID. The mailbox ID may be utilized for storage of the bearer token and/or the metadata. For example, the bearer token and/or the metadata may be stored in association with the mailbox ID, where the bearer token and/or the metadata may be identified based on the mailbox ID. For example, the mailbox ID may be utilized to indicate a storage location of the bearer token and/or the metadata when stored.

In 308, the user information application 202 may generate a mailbox. For example, the user information application 202 may generate a mailbox associated with the mailbox ID. The mailbox may be utilized for storage of the bearer token and/or the metadata. The mailbox may comprise an application mailbox at a specified uniform resource locator (URL).

In 310, the user information application 202 may generate a key. The key generated by the user information application 202 may be a symmetric key. In some embodiments, the key may be an AES key. The user information application 202 may derive the key from the mailbox ID, the password, and/or salt from the metadata received from the provisioning server 206 and/or generated by the user information application 202. In some embodiments, the key may be further derived based on a number of iterations.

In 312, the user information application 202 may securely store the key with the mailbox. 312 may be performed as part of a stateful key exchange for stateful credential sharing. 312 may be omitted in stateless credential sharing. The key may be utilized to encrypt stateful payloads in the stateful credential sharing. The user information application 202 may store the key in a secure element of the origination device, where the secure element may comprise a chip within the origination device that is designed to be protected from unauthorized access. The secure element may limit a set of applications that are allowed to access the chip and/or write to the chip.

In 314, the user information application 202 may generate an encrypted payload. The user information application 202 may generate the encrypted payload by encrypting the bearer token and/or another token (which may be referred to as a "sender push token"). The user information application 202 may perform AES encryption with the bearer token and/or the sender push token to produce the encrypted payload. The encryption of the payload may prevent one or more of the entities (such as the provisioning server 206, the relay server 210, the web application 216, and/or the provisioning server 218) from being able to read bearer token and/or the sender push token.

In 316, the user information application 202 may provide the encrypted payload and/or the metadata to the relay server 210. The encrypted payload may include the bearer token in an encrypted format. The bearer token being in the encrypted format may prevent relay server 210 from being able to read the bearer token. The user information application 202 may provide configuration information and/or the mailbox ID along with the encrypted payload and/or the metadata. The configuration information may indicate authorization policies to be implemented by the relay server 210 when sharing the credentials. The available policies may include stateless (which may allow a single write), stateful (which may allow two writes), and/or long lived (which may allow infinite writes, signatures).

In some embodiments, the user information application 202 may further provide an attestation in 316. The attestation may comprise a signature applied to the data, or some portion thereof, transmitted in 316. The attestation may be associated with the origination device executing the user information application 202 and may be utilized for determining that the origination device is a valid device for requesting the sharing of the credential. The attestation may limit or be devoid of information that can identify a user of the origination device. Accordingly, the relay server 210 may be unable to identify a user of the origination device based on the attestation, which can protect the identity of the user and/or credentials associated with the user. The relay server 210 may utilize the attestation to determine that the device requesting the sharing of the credential is a type of device that is authorized to share the credential. For example, the relay server 210 may be aware that a smartphone device is authorized to share the credential. If the relay server 210 determines that the device requesting the sharing of the credential is a smartphone device based on the attestation, the relay server 210 may allow the signal flow 200 to continue. However, if the relay server 210 determines that the device requesting the sharing of the credential is another type of device (such as another server), the relay server 210 may terminate the signal flow 200. In some embodiments, the attestation may be omitted.

In 318, the relay server 210 may convert the metadata to rich object data. The metadata may include an indication of the secured entity to which the credential can provide access. A device may utilize the rich object data to display an indication of the secured entity on the device.

Figure 4:
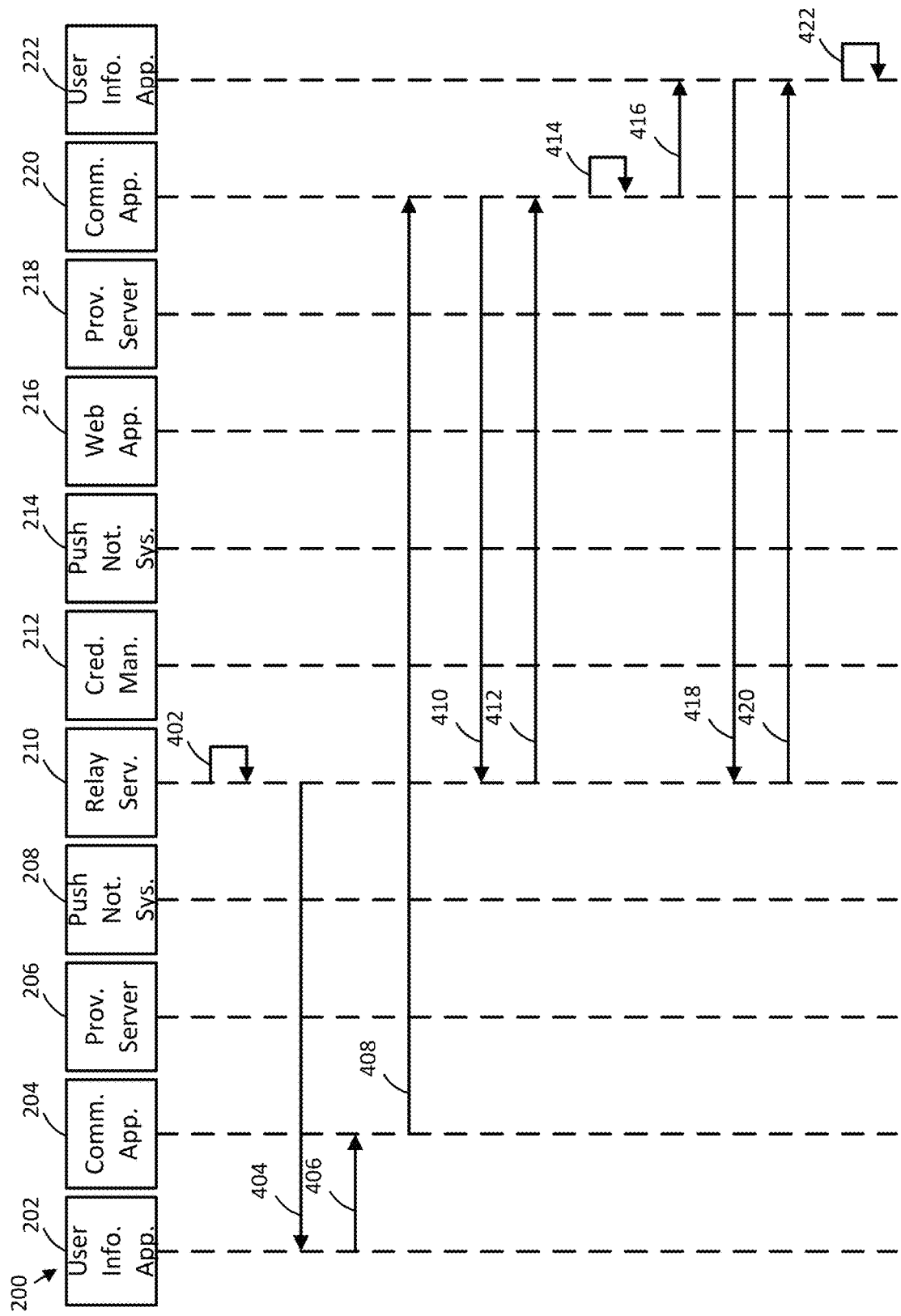
FIG. 4 illustrates a third portion of the example signal flow for sharing a credential in accordance with some embodiments.

FIG. 4 illustrates a third portion of the example signal flow 200 for sharing a credential in accordance with some embodiments. In 402, the relay server 210 may store the encrypted payload and/or the rich object data produced from the metadata in a location associated with the mailbox ID. For example, the relay server 210 may store the encrypted payload received from the user information application 202 and/or the rich object data produced from the metadata, where the location can be identified based on the mailbox ID. Further, the relay server 210 may associate the authorization policy indicated by the configuration information in 316 with the storage location, such that the relay server 210 may apply the authorization policy for any device attempting to access the storage location via the mailbox ID.

In 404, the relay server 210 may provide a universal share URL to the user information application 202. The universal share URL may correspond to the storage location associated with the mailbox ID. A device that enters the universal share URL may be directed to the storage location and may, when authenticated, be able to retrieve information from the storage location. The relay server 210 may provide the universal share URL to the user information application 202 for sharing with the recipient device to retrieve the encrypted payload and/or the rich object data stored in the storage location.

In 406, the user information application 202 may launch the communication application 204 for sharing the universal share URL received in 404 and/or the password generated in 304. For example, the user information application 202 may cause the universal share URL and/or the password to be provided to the communication application 204 for sharing with another device, such as the recipient device. The user information application 202 may transmit the password out of band for increased security. For example, the user information application 202 may transmit the password in a different communication from the token to provide for increased security.

In 408, the communication application 204 associated with the origination device may transmit the universal share URL and/or the password to the communication application 220 associated with the origination device. For example, the communication application 204 being executed by the origination device may transmit the universal share URL and/or the password in a message to the communication application 220 being executed by the recipient device.

In 410, the communication application 220 associated with the recipient device may utilize the universal share URL received in 408 to request information from the relay server 210 associated with mailbox ID. For example, the communication application 220 may transmit a request to the relay server 210 to provide at least a portion of the information associated with the universal share URL, which may be the storage location on the relay server 210 associated with the mailbox ID.

In 412, the relay server 210 may provide the rich object data generated from the metadata to the communication application 220. For example, the relay server 210 may retrieve the rich object data from the storage location based on the request received in 410 and transmit the rich object data to the communication application 220 being executed on the recipient device.

In 414, the communication application 220 may display a snapshot corresponding to the rich object data on the display of the recipient device. For example, the rich object data may include an indication of the secured entity for which the shared credential may provide access. The communication application 220 may cause the indication of the secured entity to be displayed on the display of the device. The indication may include a description of the secured entity, an image associated with the secured entity, or some other visual representation related to the secured entity that may be displayed on the display of the recipient device.

In 416, the communication application 220 may provide the universal share URL and/or the password received in 408 to the user information application 222 executing on the recipient device. In some embodiments, the communication application 220 may provide the universal share URL and/or the password to the user information application 222 based on a user interaction with the indication of the secured entity displayed on the display of the device in 414. The communication application 220 may cause the user information application 222 to launch along with providing in the universal share URL and/or the password.

In 418, the user information application 222 may transmit a request to the relay server 210 to provide the information from the mailbox. For example, the user information application 222 may transmit a request that includes the mailbox ID indicating the mailbox from which the data is being requested.

In 420, the relay server 210 may provide the rich object data generated from the metadata and/or the encrypted payload to the user information application 222. The relay server 210 may provide the rich object data and/or the encrypted payload based on the reception of the request received from the user information application 222 in 418.

In 422, the user information application 222 may generate a key. In particular, the user information application 222 may generate the key based on the rich object data, the mailbox ID, the password, and/or iterations. The key may be a symmetric key in some embodiments. The user information application 222 may derive an AES key from the rich object data, the mailbox ID, the password, and/or the iterations to produce the key.

Figure 5:
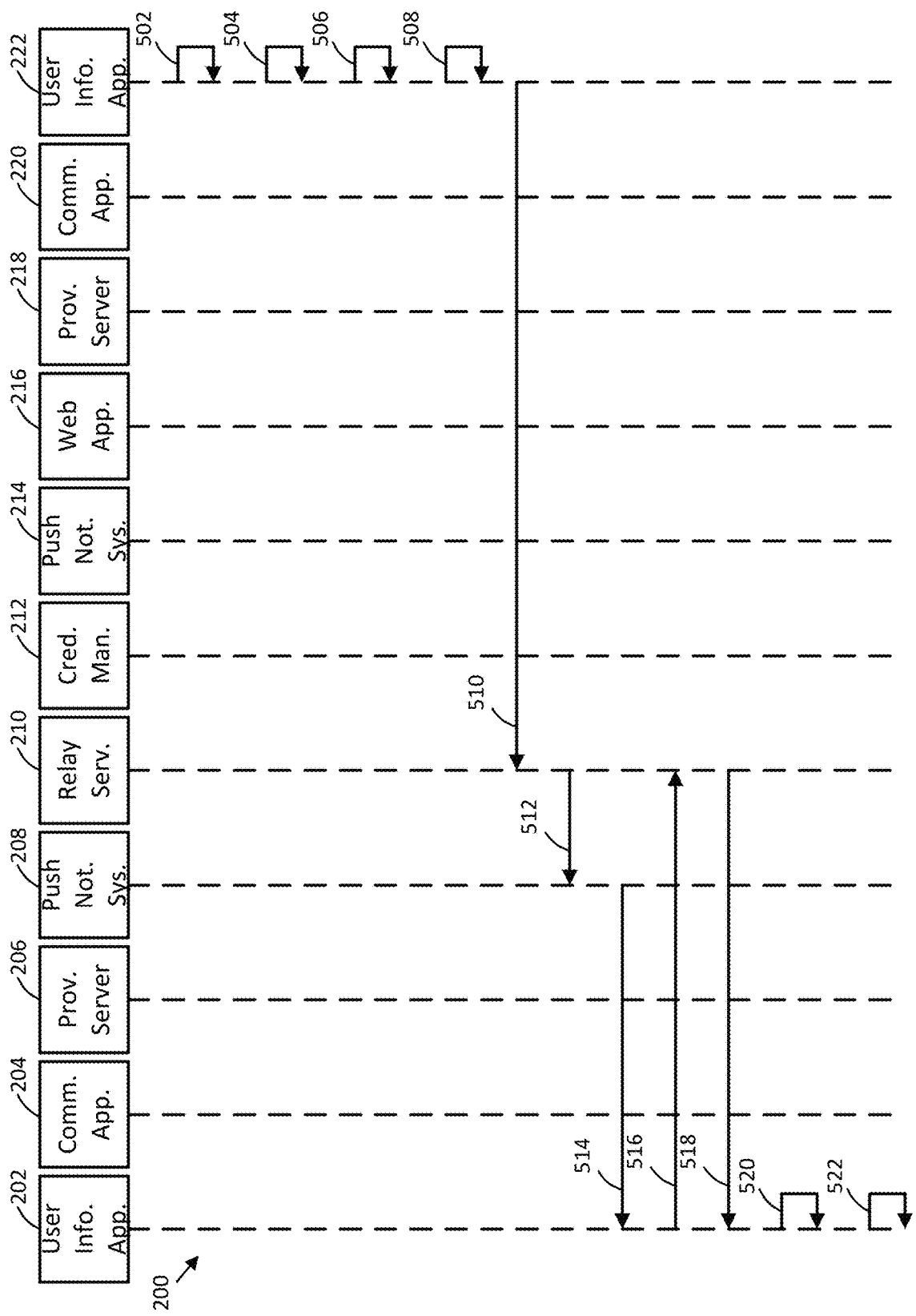
FIG. 5 illustrates a fourth portion of the example signal flow for sharing a credential in accordance with some embodiments.

FIG. 5 illustrates a fourth portion of the example signal flow 200 for sharing a credential in accordance with some embodiments. In 502, the user information application 222 may decrypt the encrypted payload received in 420 with the key generated in 422. The user information application 222 may produce the bearer token and/or the sender push token by decrypting the encrypted payload.

504 through 614 (FIG. 6) may be performed in some instances and may be omitted in other instances. For example, 504 through 614 may be performed for stateful key exchanges, whereas 504 through 614 may be omitted for stateless key exchanges. Whether the exchange is stateful or stateless may be defined based on configuration defined in 316.

In 504, the user information application 222 may securely store the key produced in 422 with association to the mailbox ID. The user information application 222 may store the key in a secure element of the recipient device.

In 506, the user information application 222 may generate a key pair. For example, the user information application 222 may generate the key pair based on the metadata for provisioning information in accordance with key requirements. The key pair may be an asymmetric key pair in some embodiments, where the asymmetric key pair may comprise a public key and a corresponding private key.

In 508, the user information application 222 may encrypt the public key of the key pair generated in 506. The user information application 222 may perform AES encryption with the public key of the key pair.

In 510, the user information application 222 may transmit the public key of the key pair generated in 506 to the relay server 210. For example, the user information application 222 may transmit the encrypted public key, which was encrypted in 508, to the relay server 210. The user information application 222 may further transmit the mailbox ID and/or the sender push token to the relay server 210 with the encrypted public key. The relay server 210 may store the encrypted public key based on the reception of the encrypted public key.

In some embodiments, the user information application 222 may further provide an attestation in 510. The attestation may comprise a signature applied to the data, or some portion thereof, transmitted in 510. The attestation may be associated with the recipient device executing the user information application 222 and may be utilized for determining that the recipient device is a valid device for obtaining the shared credential. The attestation may limit or be devoid of information that can identify a user of the recipient device. Accordingly, the relay server 210 may be unable to identify a user of the recipient device based on the attestation, which can protect the identity of the user and/or credentials associated with the user. The relay server 210 may utilize the attestation to determine that the device requesting the shared credential is a type of device that is authorized to receive the credential. For example, the relay server 210 may be aware that a smartphone device is authorized to receive the credential. If the relay server 210 determines that the device requesting the credential is a smartphone device based on the attestation, the relay server 210 may allow the signal flow 200 to continue. However, if the relay server 210 determines that the device requesting the credential is another type of device (such as another server), the relay server 210 may terminate the signal flow 200. In some embodiments, the attestation may be omitted.

In 512, the relay server 210 may request a push notification from the push notification system 208 associated with the origination device. The push notification request may include the mailbox ID, the sender push token, and/or the public key. The push notification request may request that the push notification system 208 provide a push notification to the user information application 202 that indicates a recipient device is attempting to retrieve the shared credential.

In 514, the push notification system 208 may send a push notification to the user information application 202 on the origination device. The push notification may cause a user interface to be displayed on a display of the origination device. The user interface displayed on the origination device may indicate that a recipient device is attempting to retrieve the shared credential. In some embodiments, the user interface displayed on the origination device may further request input from a user of the origination device to indicate that the recipient device is authorized to receive the shared credential. By utilizing the push notification system 208, the notification may be provided when recipient device is attempting to retrieve the credential and/or as soon as the origination device is available to receive push notifications after the recipient device has attempted to retrieve the credential.

In 516, the user information application 202 may send a request to the relay server 210 to retrieve information from the relay server 210. The information requested by the user information application 202 may include the encrypted public key that was stored in 510.

In 518, the relay server 210 may transmit information to the user information application 202 based on the request from 516. For example, the relay server 210 may transmit the encrypted public key to the user information application 202.

In 520, the user information application 202 may decrypt the information received from the relay server 210. For example, the user information application 202 may decrypt the encrypted public key received in 518. The user information application 202 may decrypt the encrypted public key using a receiver push token. Decrypting the encrypted public key may produce the public key.

In 522, the user information application 202 may generate a signature. For example, the wallet key may generate a signature based on the bearer token, the public key, and/or the mailbox ID. The signature may cover the public key that was produced through the decryption in 520. In some embodiments, the signature may include an attestation, a token, and/or entitlements. In some embodiments, the signature may be used in place of the bearer token going forward in the signal flow 200.

Figure 6:
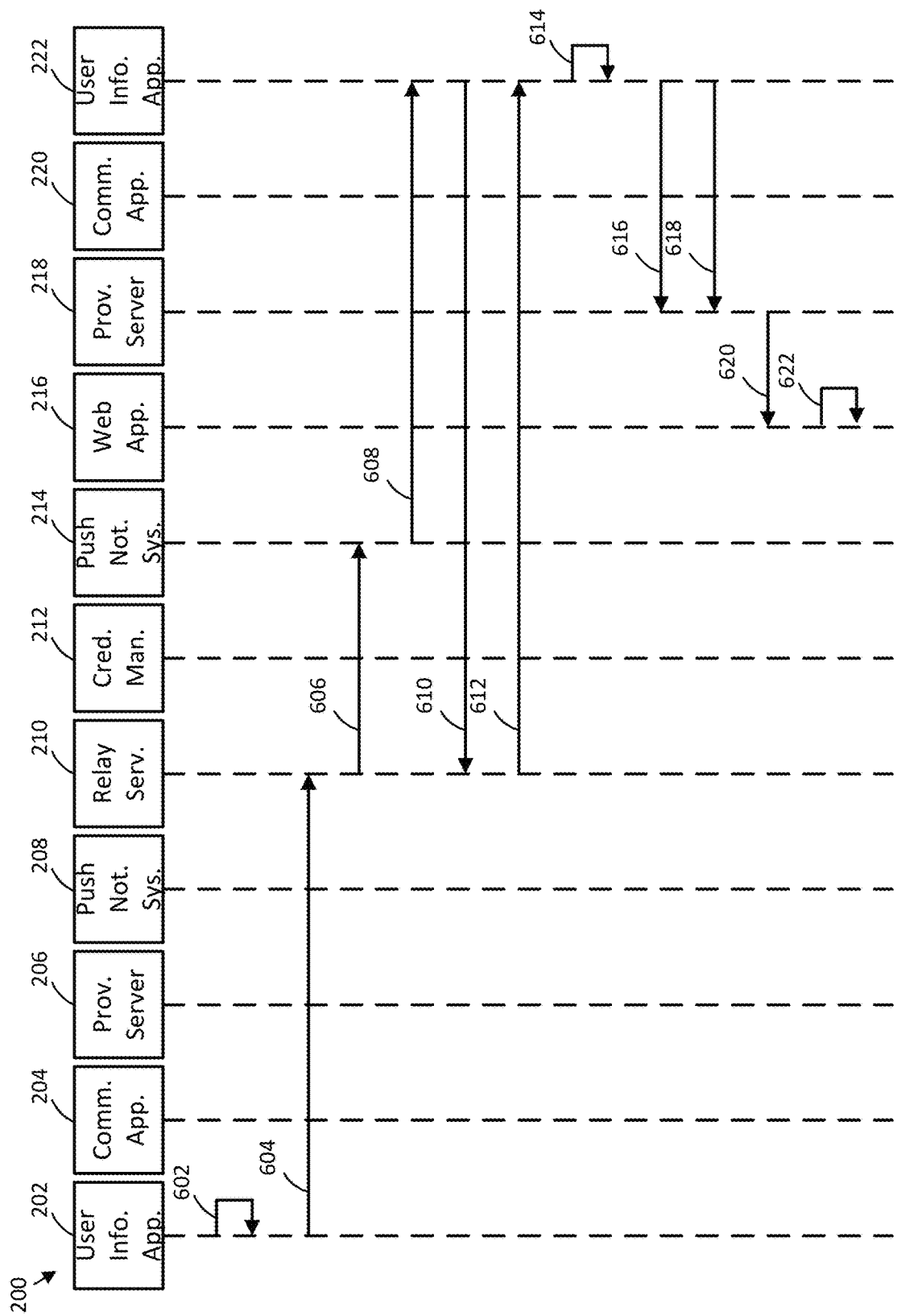
FIG. 6 illustrates a fifth portion of the example signal flow for sharing a credential in accordance with some embodiments.

FIG. 6 illustrates a fifth portion of the example signal flow 200 for sharing a credential in accordance with some embodiments. In 602, the user information application 202 may encrypt the signature to produce an encrypted payload. For example, the user information application 202 may encrypt the signature generated in 522 using AES encryption to produce the encrypted payload.

In 604, the user information application 202 may provide the encrypted payload to the relay server 210 for storage. The user information application 202 may further provide a nonce value (for example, the nonce value may be an arbitrary number), the receiver push token, and/or the mailbox ID to the relay server 210 with the encrypted payload. The relay server 210 may store the encrypted payload when received. For example, the relay server 210 may store the encrypted payload in a storage location corresponding to the mailbox ID. Due to the encrypted payload being encrypted, the relay server 210 may be unable to read the data within the encrypted payload.

In 606, the relay server 210 may transmit a request for a push notification to the push notification system 214 associated with the recipient device. The request may include the mailbox ID and/or the receiver push token.

In 608, the push notification system 214 may transmit a push notification to the user information application 222 executed by the recipient device. The push notification system 214 may transmit the push notification based on the request for the push notification received by the push notification system in 606. The push notification may cause a user interface to be displayed on a display of the recipient device. The push notification may include the mailbox ID and/or the receiver push token.

In 610, the user information application 222 may transmit a request for information to the relay server 210. For example, the user information application 222 may transmit a request for the relay server 210 to provide at least a portion of the information stored in the storage location corresponding to the mailbox ID.

In 612, the relay server 210 may transmit the encrypted payload stored in the storage location corresponding to the mailbox ID to the user information application 222. For example, the relay server 210 may transmit the encrypted payload stored in 604 to the user information application 222. The encrypted payload may include the encrypted signature.

In 614, the user information application 222 may decrypt encrypted payload received from the relay server 210 in 612. For example, the user information application 222 may perform AES decrypting with the encrypted payload. The decryption of the encrypted payload may produce the signature.

616 and 618 may be performed in the alternative in difference embodiments. For example, 616 may be performed in some instances and 618 may be performed in other instances. 616 may be performed in instances where a stateless key exchange is being performed. 618 may be performed in instances where a stateful key exchange is being performed. Whether the exchange is stateful or stateless may be defined based on configuration defined in 316.

In 616, the user information application 222 may launch an application programming interface (API) with the provisioning server 218 associated with the recipient device. The API may be utilized for eligibility for retrieving the shared credential. The user information application 222 may provide the bearer token and/or the rich object data received in 420.

In 618, the user information application 222 may launch an application programming interface (API) with the provisioning server 218 associated with the recipient device. The API may be utilized for eligibility for retrieving the shared credential. The user information application 222 may provide the bearer token, the rich object data received in 420, the signature produced in 614, and/or the mailbox ID.

In 620, the provisioning server 218 may transmit a redeem request to the web application 216. The redeem request may indicate a provisioning target for the redemption. The redeem request may include the mailbox ID, the bearer token, and/or the rich object data.

In 622, the web application 216 may extract a card template. For example, the web application 216 may utilize the rich object data to extract a card template. The card template may correspond to the credential to be retrieved.

Figure 7:
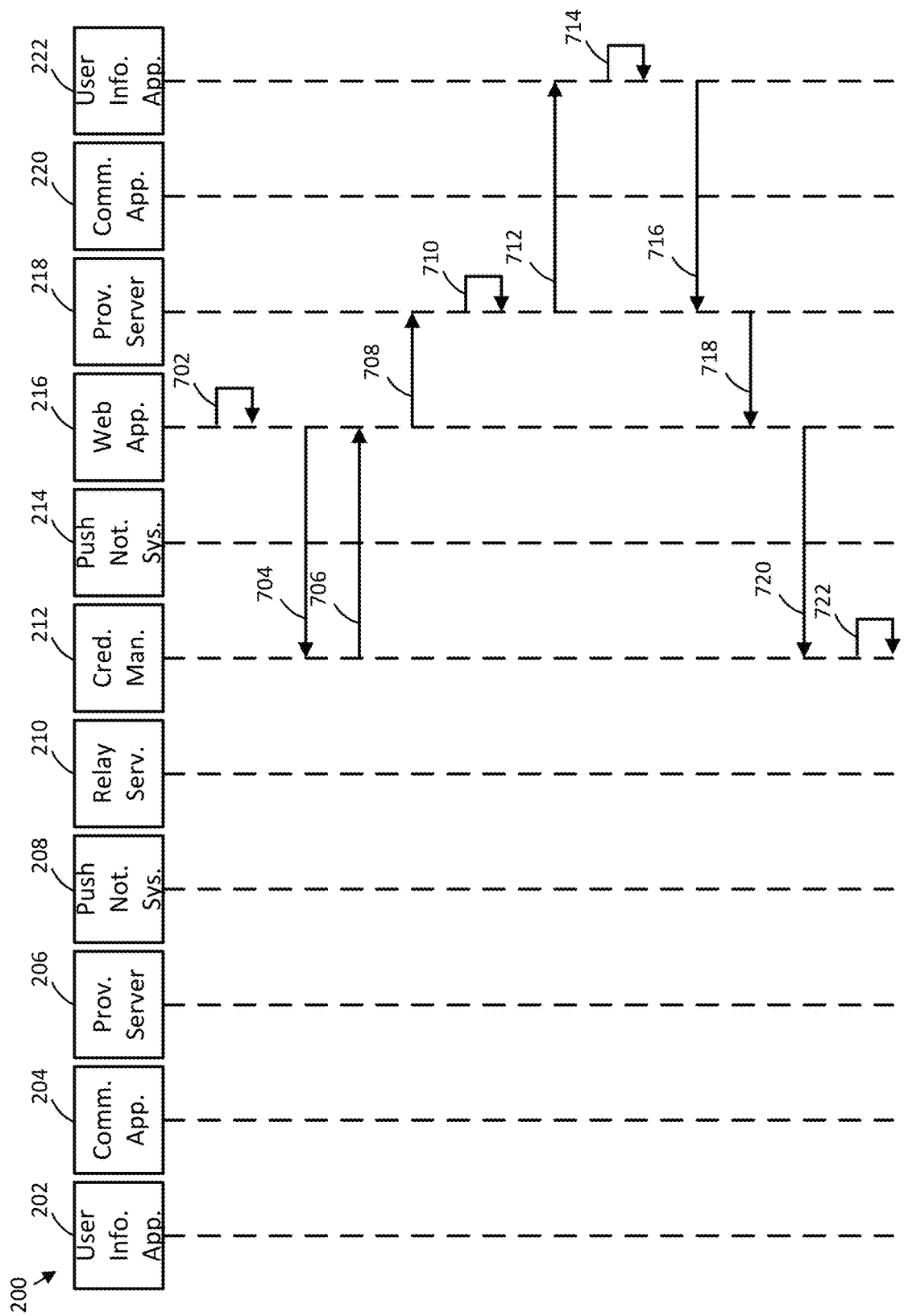
FIG. 7 illustrates a sixth portion of the example signal flow for sharing a credential in accordance with some embodiments.

FIG. 7 illustrates a sixth portion of the example signal flow 200 for sharing a credential in accordance with some embodiments. In 702, the web application 216 may determine a source of the credential. For example, the web application 216 may determine which credential manager manages credentials for the secured entity based on the card template extracted in 622. In the illustrated embodiment, the web application 216 may determine that the credential manager 212 manages the credential being shared.

In 704, the web application 216 may transmit a redeem request to the credential manager 212 determined in 702. The redeem request may indicate a provisioning target for the redemption. The redeem request may include the bearer token.

In 706, the credential manager 212 may transmit at least a portion of the information utilized by the credential manager 212 for providing the shared credential to the web application 216. In some embodiments, the information provided by the credential manager 212 may include encrypted card fields generated by the credential manager 212, requirements for retrieving and/or utilizing the shared credential, and/or a provisioning bundle ID. The provisioning bundle ID may indicate a provisioning bundle that may be utilized for provisioning the shared credential to the recipient device.

In 708, the web application 216 may transmit the information received from the credential manager 212 to the provisioning server 218. For example, the web application may transmit the encrypted card fields, the requirements, and/or the provisioning bundle ID to provisioning server 218.

In 710, the provisioning server 218 may create a card session that may be utilized for provisioning the credential to the recipient device. The provisioning server 218 may further generate a card session ID corresponding to the card session that may be utilized for identifying the card session.

In 712, the provisioning server 218 may transmit information to the user information application 222 being executed by the recipient device, where the information may be utilized for completing the provisioning of the credential to the recipient device. For example, the provisioning server 218 may transmit the card session ID generated in 710 to the user information application 222. The provisioning server 218 may further transmit a request to generate information to be used for the provisioning of the credential to the recipient device. For example, the provisioning server 218 may transmit a request for the user information application 222 to generate a privacy key, generate a public key (such as a FIDO key), and/or generate a transmission (Tx) key.

In 714, the user information application 222 may generate one or more keys. For example, the user information application 222 may generate the key or keys that are requested to be generated by the transmission of 712. In particular, the user information application 222 may generate one or more privacy keys, one or more public keys, and/or one or more Tx keys. The keys may include FIDO keys and/or device encryption keys.

In 716, the user information application 222 may provide the keys generated in 714 to the provisioning server 218. For example, the user information application 222 may provide the privacy keys, the public keys, and/or the Tx keys to the provisioning server 218. The user information application 222 may further transmit the card session ID to the provisioning server 218.

In 718, the provisioning server 218 may transmit a provisioning bundle request to the web application 216. The provisioning bundle request may include the provisioning bundle ID and/or the keys received by the provisioning server 218 in 716. The provisioning bundle request may request a provisioning bundle to be generated for the recipient device.

In 720, the web application 216 may transmit the provisioning bundle request received in 718 to the credential manager 212. The provisioning bundle request may request the credential manager 212 to generate a provisioning bundle for provisioning the shared credential to the recipient device.

In 722, the credential manager 212 may verify the provisioning bundle request. For example, the credential manager 212 may utilize the provisioning bundle ID and/or the keys received in 720 to verify that the provisioning bundle request is authorized for being performed. In particular, the credential manager 212 may determine the provisioning bundle to be retrieved by the provisioning bundle request based on the provisioning bundle ID, and may utilize the keys to verify that the recipient device is authorized to retrieve the provisioning bundle. If the credential manager 212 determines that the recipient device is authorized to retrieve the provisioning bundle, the signal flow 200 may continue. If the credential manager 212 determines that the recipient device is not authorized to retrieve the provisioning bundle, the signal flow 200 may be terminated.

Figure 8:
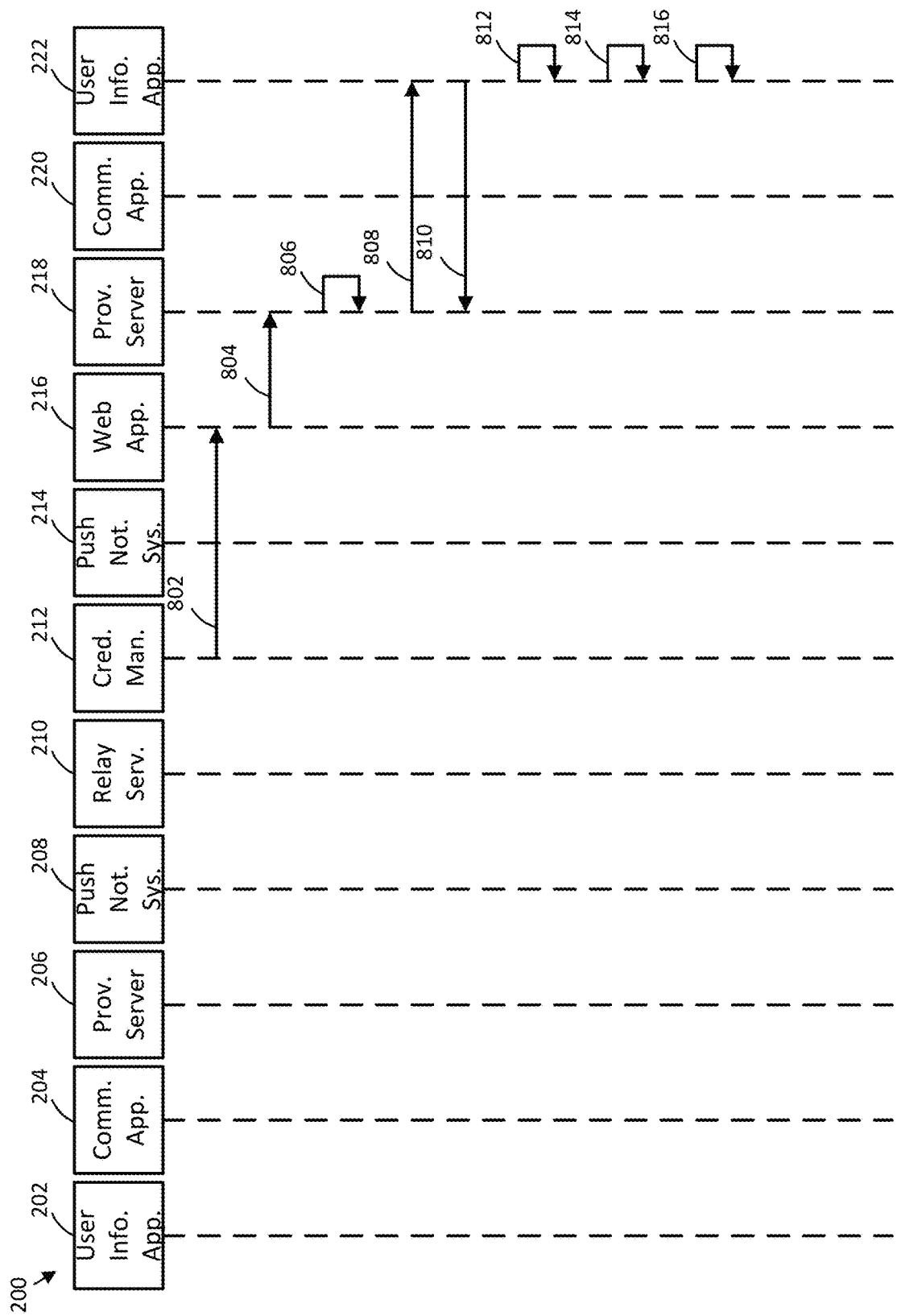
FIG. 8 illustrates a seventh portion of the example signal flow for sharing a credential in accordance with some embodiments.

FIG. 8 illustrates a seventh portion of the example signal flow 200 for sharing a credential in accordance with some embodiments. In 802, the credential manager 212 may provide a provisioning bundle to the web application 216. For example, the credential manager 212 may generate a provisioning bundle based on the reception of the provisioning bundle request received by the credential manager 212 received in 722. The provisioning bundle may provide data for provisioning the credential to the recipient device. In some embodiments, the provisioning bundle may include the credential which the recipient device may utilize for accessing the secured entity.

In 804, the web application 216 may provide credential data and/or encrypted entitlements to the provisioning server 218. For example, the web application 216 may extract the credential data and/or the encrypted entitlements from the provisioning bundle provided in 802. The credential data may include information for generating the credential on the recipient device in some embodiments. In some embodiments, the encrypted entitlements may include indications of limitations for the use of the credential by the recipient device, such as defined times when the recipient device may utilize the credential to access the secured entity.

In 806, the provisioning server 218 may generate the credential for the recipient device. For example, the provisioning server 218 may generate the credential from the credential data received in 804. Generating the credential by the provisioning server may include generating a credential in a format that can operate with platform executed by the recipient. In instances where the origination device and the recipient device execute different platforms, the format of the credential generated for the recipient device may be different than the format of the credential being utilized by the origination device.

In 808, the provisioning server 218 may provide a credential URL to the user information application 222 being executed by the recipient device. The credential URL may indicate a location from which the user information application 222 can retrieve the credential.

In 810, the user information application 222 may download the credential from the provisioning server 218. For example, the user information application 222 may access the credential from the location on the provisioning server 218 indicated by the credential URL. The user information application 222 store the credential, thereby providing the recipient device with the shared credential.

In 812, the user information application 222 may download an encrypted sharing bundle. For example, the user information application 222 may download an encrypted sharing bundle related to the credential. The encrypted sharing bundle may include encrypted information for indicating the credential and/or the secured entity to a user of the recipient device.

In 814, the user information application 222 may decrypt the encrypted sharing bundle. For example, the user information application 222 may decrypt the encrypted sharing bundle downloaded in 812 to produce the sharing bundle. The sharing bundle may include information for indicating the credential and/or the secured entity. For example, the sharing bundle may include images data and/or textual data that may be rendered within the user information application 222 to produce images and/or text that can be displayed in a user interface of the user information application 222.

In 816, the user information application 222 may store the sharing bundle. For example, the user information application 222 may store the sharing bundle in the secured element of the recipient device. The stored sharing bundle may allow the user information application 222 to display an indication of the credential and/or the secured entity for selection by the user of the recipient device. In some embodiments, the recipient device may detect a user interaction with the indication of the credential and/or the secured entity and may cause the secured entity to provide access to the user of the recipient device. In other embodiments, the secured entity may provide access based on the secured entity determining that the recipient device is located within a proximity of the secured entity and the recipient device has the credential and/or the sharing bundle stored on the recipient device.

Figure 9:
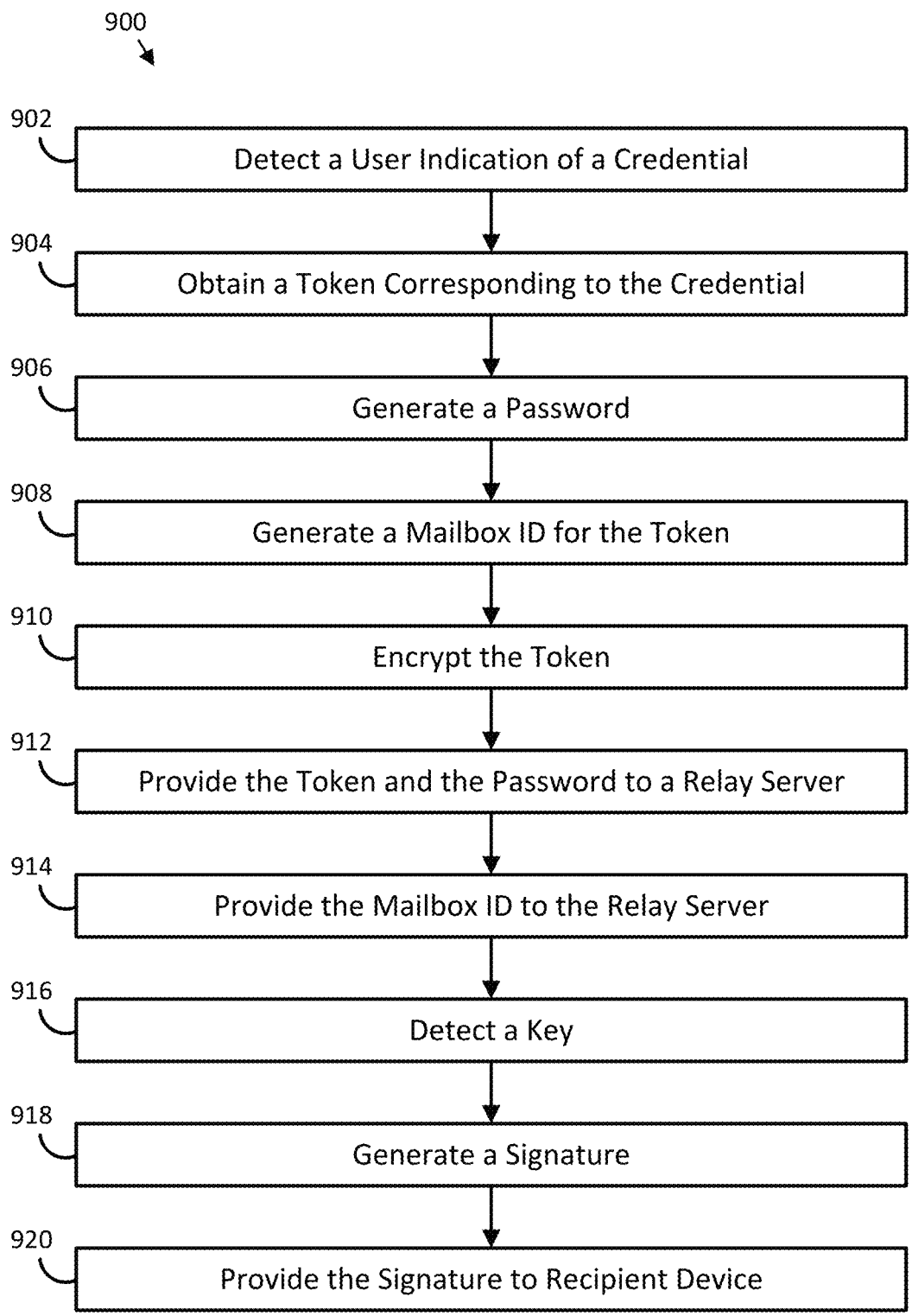
FIG. 9 illustrates an example procedure for sharing a credential by an origination device with a recipient device in accordance with some embodiments.

FIG. 9 illustrates an example procedure 900 for sharing a credential by an origination device with a recipient device in accordance with some embodiments. For example, the procedure 900 may be performed by an origination device, such as the origination device 102 (FIG. 1). The origination device may share the credential with a recipient device, such as the recipient device 104 (FIG. 1) via the procedure 900. In some embodiments, the recipient device may operate a different platform than the origination device. Further, the credential being shared by the procedure 900 may be an unclonable credential. While illustrated in a certain order, it should be understood that one or more of the operations of the procedure 900 may be performed in a different order and/or concurrently. Further, operations within the procedure 900 may provide a destination of a transmission (such as an object being provided to an entity or an object being transmitted to an entity), although it should be understood that the transmission may pass through one or more entities to arrive at the destination.

In 902, the origination device may detect a user indication of a credential to be shared with the recipient device. For example, the origination device may display indications of credentials that may be shared with another device, such as the recipient device. The origination device may detect a user interaction which indicates a credential is to be shared with the recipient device, such as the user interaction detected in 226 (FIG. 2).

In 904, the origination device may obtain a token corresponding to the credential. For example, the origination device may obtain a token corresponding to the credential from a credential manager (such as the credential manager 212 (FIG. 2)). The token may comprise a bearer token, such as the bearer token received in 242 (FIG. 2). In some embodiments, obtaining the token may include identifying entitlements, comprising an indication of the credential, which define use limitations for the credential and providing an indication of the entitlements to the credential manager. The token may be generated based at least in part on the entitlements identified.

In 906, the origination device may generate a password. For example, the origination device may generate a password for protection of the token, such as the generation of the password in 304 (FIG. 3).

In 908, the origination device may generate a mailbox ID for the token. For example, the origination device may generate a mailbox ID for the token, such as the generation of the mailbox ID in 306 (FIG. 3). In some embodiments, 908 may be omitted.

In 910, the origination device may encrypt the token. For example, the origination device encrypts the token obtained in 904, such as the encryption of the token in 314 (FIG. 3). In some embodiments, 910 may be omitted.

In 912, the origination device may provide the token and/or the password to a relay server (such as the relay server 210 (FIG. 2)). For example, the origination device may provide the token and/or the password to the relay server for storage, such as the provision of the token in 316 (FIG. 3) and/or the provision of the password in 406 (FIG. 4). The recipient device may be configured to retrieve the token from the relay server with the password. In some embodiments, the token provided to the relay server may be encrypted token from 910. The relay server may be unable to decode the encrypted token.

In 914, the origination device may provide the mailbox ID to the relay server. For example, the origination device may provide the mailbox ID to relay server with the token and the password. The relay server may be configured to store the token associated with the mailbox identifier and identify the token for retrieval by the recipient device based at least in part on the mailbox identifier. In some embodiments, 914 may be omitted.

In 916, the origination device may detect a key. For example, the origination device may detect a key provided by the recipient device, such as the key received in 518 (FIG. 5). In some embodiments, the key may comprise a public key of an asymmetric key pair generated by the recipient device. In some embodiments, 916 may be omitted.

In 918, the origination device may generate a signature. The origination device may generate the signature based at least in part on the key detected in 916, such as the generation of the signature in 522 (FIG. 5). In some embodiments, the signature may cover the public key detected in 916. For example, the signature being based on the public key may allow the signature to represent the public key.

In 920, the origination device may provide the signature to the recipient device. For example, the origination device may provide the signature to the recipient device, such as the signature being provided in 604 (FIG. 6). The recipient device may be configured to use the signature for provisioning of the credential.

Figure 10:
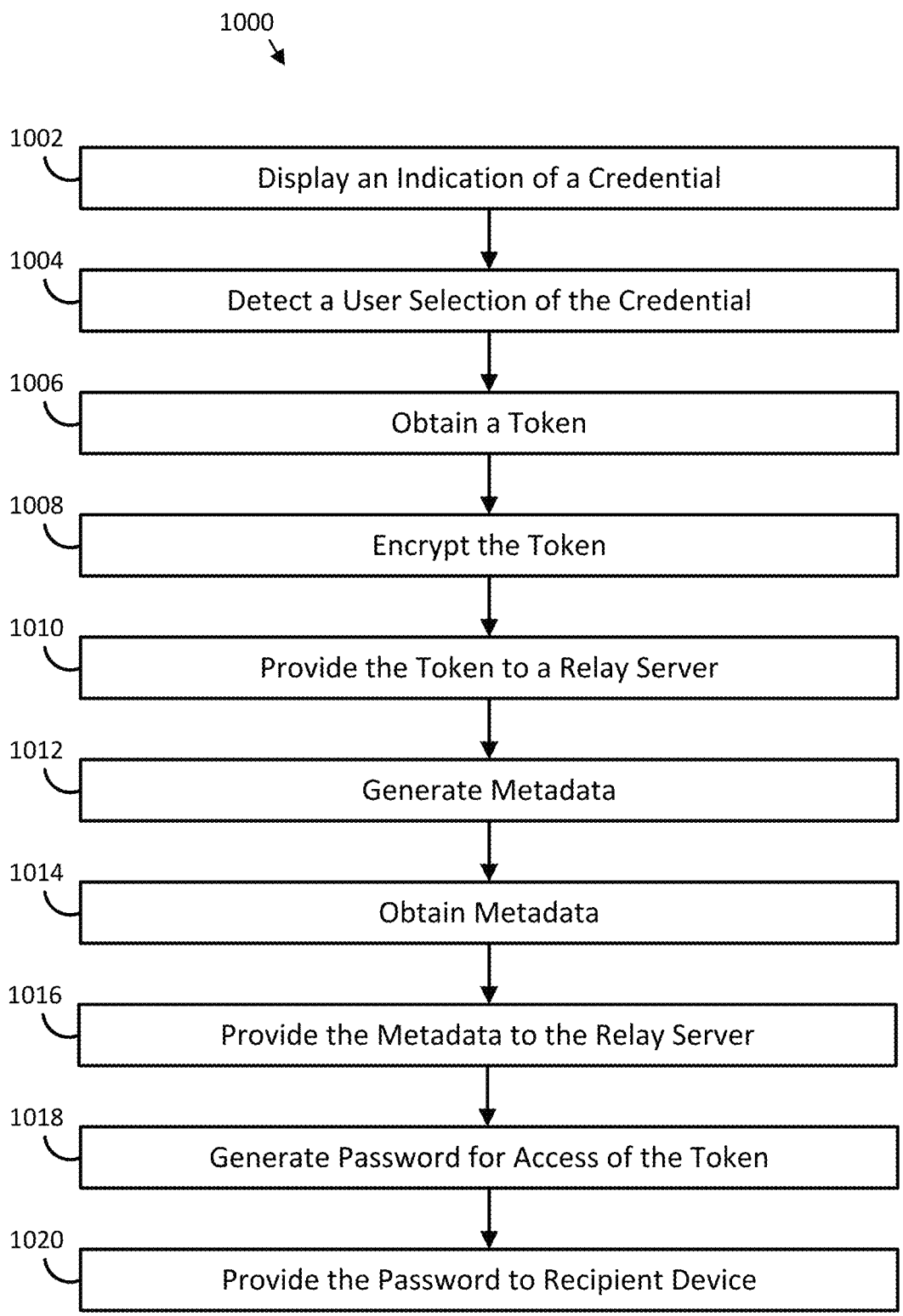
FIG. 10 illustrates another example procedure for sharing a credential by an origination device with a recipient device in accordance with some embodiments.

FIG. 10 illustrates another example procedure 1000 for sharing a credential by an origination device with a recipient device in accordance with some embodiments. For example, the procedure 1000 may be performed by an origination device, such as the origination device 102 (FIG. 1). The origination device may share the credential with a recipient device, such as the recipient device 104 (FIG. 1) via the procedure 1000. In some embodiments, the recipient device may operate a different platform than the origination device. Further, the credential being shared by the procedure 1000 may be an unclonable credential. While illustrated in a certain order, it should be understood that one or more of the operations of the procedure 1000 may be performed in a different order and/or concurrently. Further, operations within the procedure 1000 may provide a destination of a transmission (such as an object being provided to an entity or an object being transmitted to an entity), although it should be understood that the transmission may pass through one or more entities to arrive at the destination.

In 1002, the origination device may display an indication of a credential. For example, the origination device may display an indication that the credential can be shared with a recipient, such as the presentation of credentials that can be shared in 228 (FIG. 2).

In 1004, the origination device may detect a user selection of the credential. For example, the origination device may detect a user selection of the credential to be shared with the recipient device, such as the user selection in 230 (FIG. 2).

In 1006, the origination device may obtain a token. For example, the origination device may obtain a token corresponding to the credential, such as the reception of the bearer token in 244 (FIG. 2) or 302 (FIG. 3). In some embodiments, obtaining the token may include generating the token based at least in part on the credential. In some other embodiments, the origination device may obtain the token from a credential manager, such as the credential manager 212 (FIG. 2).

In 1008, the origination device may encrypt the token. For example, the origination device may encrypt the token obtained in 1006, such as the encryption of the token in 314 (FIG. 3). In some embodiments, 1008 may be omitted.

In 1010, the origination device may provide the token to a relay server. For example, the origination device may provide the token to a relay server (such as the relay server 210 (FIG. 2)) for storage, such as the provision of the token in 316 (FIG. 3). The recipient device may be configured to retrieve the token from the relay server for provision of the credential. In some embodiments, the token provided to the relay server may be the encrypted token from 1008, where the relay server may be unable to decode the encrypted token.

In 1012, the origination device may generate metadata. For example, the origination device may generate metadata that includes first provisioning information associated with a first platform operated by the origination device and second provisioning information associated with a second platform operated by the recipient device, such as the generation of the metadata in 302 (FIG. 3). In some embodiments, 1012 may be omitted.

In 1014, the origination device may obtain metadata. For example, the origination device may obtain the metadata from the credential manager, such as the receiving of the metadata in 242 (FIG. 2). The metadata may comprise first provisioning information associated with a first platform operated by the origination device and second provisioning information associated with a second platform operated by the recipient device. In some embodiments, 1014 may be omitted.

In 1016, the origination device may generate a password for access of the token. For example, the origination device may generate a password for access of the token stored on the relay server, such as the generation of the password in 304 (FIG. 3). In some embodiments, 1016 may be omitted.

In 1018, the origination device may provide the metadata to the relay server. For example, the origination device may provide the metadata generated in 1012 or the metadata obtained in 1014 to the relay server for storage with the token, such as the provision of the metadata in 402 (FIG. 4). The recipient device may be configured to retrieve the metadata for provision of the credential. In some embodiments, 1018 may be omitted.

In 1020, the origination device may provide the password to the recipient device. For example, the origination device may provide the password to the recipient device out of band, such as the provision of the password in 406 (FIG. 4). In some embodiments, 1020 may be omitted.

Figure 11:
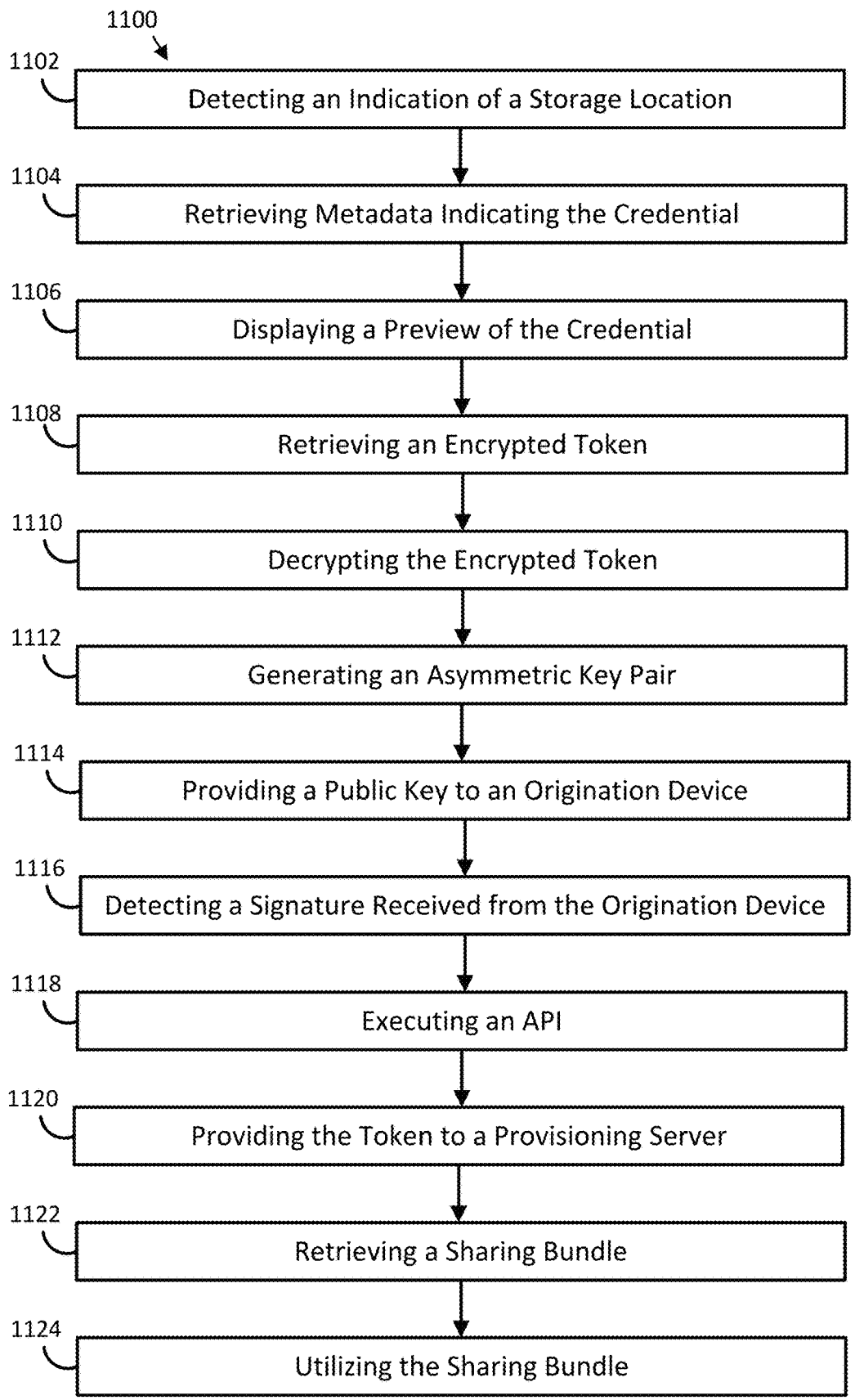
FIG. 11 illustrates an example procedure for obtaining a credential by a recipient device in accordance with some embodiments.

FIG. 11 illustrates an example procedure 1100 for obtaining a credential by a recipient device in accordance with some embodiments. For example, the procedure 1100 may be performed by a recipient device, such as the recipient device 104 (FIG. 1). The credential being obtained by the recipient device may have been shared by an origination device, such as the origination device 102 (FIG. 1). While illustrated in a certain order, it should be understood that one or more of the operations of the procedure 1000 may be performed in a different order and/or concurrently. Further, operations within the procedure 1000 may provide a destination of a transmission (such as an object being provided to an entity or an object being transmitted to an entity), although it should be understood that the transmission may pass through one or more entities to arrive at the destination.

In 1102, the recipient device may detect an indication of a storage location. For example, the recipient device may detect an indication of a storage location of an encrypted token associated with a credential for providing access via the recipient device, such as the reception of the universal share URL in 408 (FIG. 4) and/or the reception of the mailbox ID in 420 (FIG. 4).

In 1104, the recipient device may retrieve metadata indicating the credential. For example, the recipient device may retrieve metadata indicating the credential to be provisioned, such as the reception of the metadata in 412 (FIG. 4). In some embodiments, 1104 may be omitted.

In 1106, the recipient device may display a preview of the credential. For example, the recipient device may display, on a display of the recipient device, a preview of the credential based at least in part of the metadata, such as the display of the indication in 414 (FIG. 4). Displaying the preview of the credential may include displaying an image and/or text indicating the credential and/or a secure entity for which the credential provides access. In some embodiments, 1106 may be omitted.

In 1108, the recipient device may retrieve an encrypted token. For example, the recipient device may retrieve an encrypted token from the storage location, detected in 1102, on a relay server (such as the relay server 210 (FIG. 2)), such as the reception of the encrypted token in 420 (FIG. 4).

In 1110, the recipient device may decrypt the encrypted token. For example, the recipient device may decrypt the encrypted token retrieved in 1108 to produce a token, such as the decrypting of the encrypted token in 502 (FIG. 5).

In 1112, the recipient device may generate an asymmetric key pair. For example, the recipient device may generate an asymmetric key pair, such as the generation of the key pair in 506 (FIG. 5). In some embodiments, 1112 may be omitted.

In 1114, the recipient device may provide a public key to the origination device. For example, the recipient device may provide a public key of the asymmetric key pair to an origination device sharing the credential with the recipient device, such as the provision of the public key in 510 (FIG. 5). The recipient device may provide the public key to retrieve a signature from the origination device. In some embodiments, 1114 may be omitted.

In 1116, the recipient device may detect a signature received from the origination device. For example, the recipient device may detect a signature received from the origination device, such as the reception of the signature in 612. The signature may allow for provisioning of the credential of the recipient device. In some embodiments, 1116 may be omitted.

In 1118, the recipient device may execute an API. For example, the recipient device may execute an API with a provisioning server (such as the provisioning server 218 (FIG. 2)), such as the execution of the API in 616 (FIG. 6) or 618 (FIG. 6). In some embodiments, 1118 may be omitted.

In 1120, the recipient device may provide the token to the provisioning server. For example, the recipient device may provide the token to the provisioning server via the API, such as the provision of the token in 616 or 618. The recipient device may provide the token to the provisioning server to retrieve the provisioning bundle. In some embodiments, 1120 may be omitted.

In 1122, the recipient device may retrieve a sharing bundle. For example, the recipient device may retrieve a sharing bundle based at least in part on the token, such as the retrieval of the sharing bundle in 812 (FIG. 8).

In 1124, the recipient device may utilize the sharing bundle. For example, the recipient device may utilize the sharing bundle to provision the credential device to the recipient device, such as the storing of the sharing bundle in 816 (FIG. 8).

FIG. 12 illustrates an example UE 1200 in accordance with some embodiments. The UE 1200 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1200 may be a RedCap UE or NR-Light UE.

The UE 1200 may include processors 1204, RF interface circuitry 1208, memory/storage 1212, user interface 1216, sensors 1220, driver circuitry 1222, power management integrated circuit (PMIC) 1224, antenna structure 1226, and battery 1228. The components of the UE 1200 may be implemented as integrated circuits (ICs), portions thereof, discrete electronic devices, or other modules, logic, hardware, software, firmware, or a combination thereof. The block diagram of FIG. 12 is intended to show a high-level view of some of the components of the UE 1200. However, some of the components shown may be omitted, additional components may be present, and different arrangement of the components shown may occur in other implementations.

The components of the UE 1200 may be coupled with various other components over one or more interconnects 1232, which may represent any type of interface, input/output, bus (local, system, or expansion), transmission line, trace, optical connection, etc. that allows various circuit components (on common or different chips or chipsets) to interact with one another.

The processors 1204 may include processor circuitry such as, for example, baseband processor circuitry (BB) 1204A, central processor unit circuitry (CPU) 1204B, and graphics processor unit circuitry (GPU) 1204C. The processors 1204 may include any type of circuitry or processor circuitry that executes or otherwise operates computer-executable instructions, such as program code, software modules, or functional processes from memory/storage 1212 to cause the UE 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1212 may include one or more non-transitory, computer-readable media that includes instructions (for example, communication protocol stack 1236) that may be executed by one or more of the processors 1204 to cause the UE 1200 to perform various operations described herein. The memory/storage 1212 include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1208 may include transceiver circuitry and radio frequency front module (RFEM) that allows the UE 1200 to communicate with other devices over a radio access network. The RF interface circuitry 1208 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1226 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1226.

In various embodiments, the RF interface circuitry 1208 may be configured to transmit/receive signals in a manner compatible with NR access technologies.

The antenna 1226 may include antenna elements to convert electrical signals into radio waves to travel through the air and to convert received radio waves into electrical signals. The antenna elements may be arranged into one or more antenna panels. The antenna 1226 may have antenna panels that are omnidirectional, directional, or a combination thereof to enable beamforming and multiple input, multiple output communications. The antenna 1226 may include microstrip antennas, printed antennas fabricated on the surface of one or more printed circuit boards, patch antennas, phased array antennas, etc. The antenna 1226 may have one or more panels designed for specific frequency bands including bands in FR1 or FR2.

The user interface circuitry 1216 includes various input/output (I/O) devices designed to enable user interaction with the UE 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1200.

The sensors 1220 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1222 may include software and hardware elements that operate to control particular devices that are embedded in the UE 1200, attached to the UE 1200, or otherwise communicatively coupled with the UE 1200. The driver circuitry 1222 may include individual drivers allowing other components to interact with or control various input/output (I/O) devices that may be present within, or connected to, the UE 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, audio drivers to control and allow access to one or more audio devices.

The PMIC 1224 may manage power provided to various components of the UE 1200. In particular, with respect to the processors 1204, the PMIC 1224 may control power-source selection, voltage scaling, battery charging, or DC-to-DC conversion.

In some embodiments, the PMIC 1224 may control, or otherwise be part of, various power saving mechanisms of the UE 1200. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1200 may power down for brief intervals of time and thus save power. If there is no data traffic activity for an extended period of time, then the UE 1200 may transition off to an RRC_Idle state, where it disconnects from the network and does not perform operations such as channel quality feedback, handover, etc. The UE 1200 goes into a very low power state and it performs paging where again it periodically wakes up to listen to the network and then powers down again. The UE 1200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1228 may power the UE 1200, although in some examples the UE 1200 may be mounted deployed in a fixed location, and may have a power supply coupled to an electrical grid. The battery 1228 may be a lithium ion battery, a metal-air battery, such as a zinc-air battery, an aluminum-air battery, a lithium-air battery, and the like. In some implementations, such as in vehicle-based applications, the battery 1228 may be a typical lead-acid automotive battery.

Figure 13:
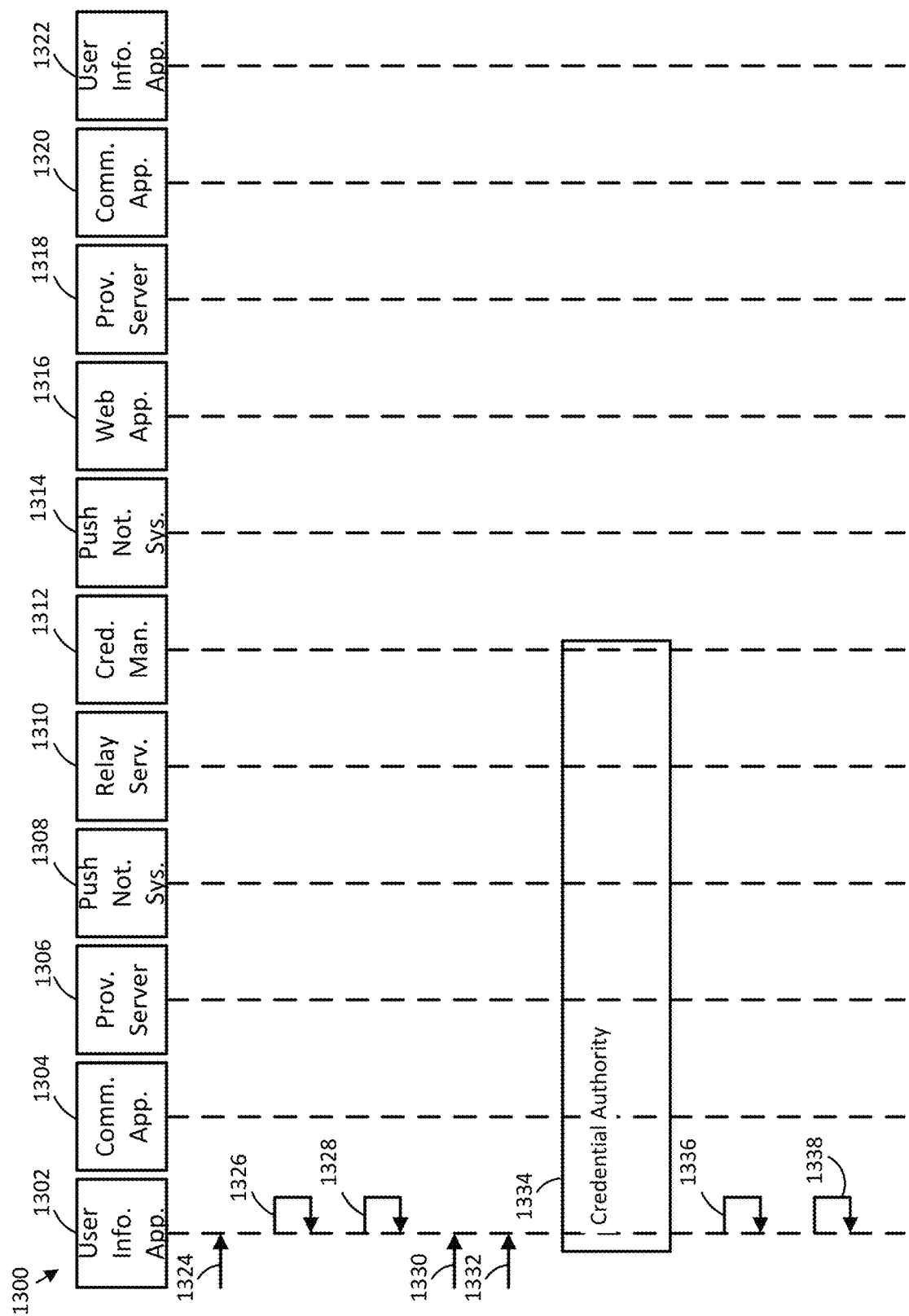
FIG. 13 illustrates a first portion of an example signal flow for sharing a credential in accordance with some embodiments.

FIG. 13 illustrates a first portion of an example signal flow 1300 for sharing a credential in accordance with some embodiments. In particular, the signal flow 1300 indicates signals and operations that may be performed for sharing a credential between a first device (referred to as "origination device") and a second device (referred to as "recipient device"). Some of the signals and/or operations illustrated may be implemented in the alternative, as described further herein. Further, it should be understood that the signals and/or operations, or some portions thereof, may be performed concurrently and/or some of the signals and/or operations may be omitted in embodiments.

The signal flow 1300 may be implemented among multiple entities that facilitate the sharing of the credential between the origination device and the recipient device. For example, the signal flow 1300 may include a user information application 1302 being executed by the origination device. The user information application 1302 may include one or more of the features of the user information application 202 (FIG. 2). In some embodiments, the user information application 1302 may be a wallet application, where the wallet application may retrieve account information and/or balance information from a credential manager and represent the account information and/or balance information on the origination device. The origination device may be, or may include one or more of the features of, the origination device 102 (FIG. 1). The user information application 1302 may store one or more credentials that allow the origination device to access a secured entity. For example, the user information application 1302 may have been assigned, and have stored, a credential (such as the credential 110 (FIG. 1)). The credential may provide the origination device with access to a secured entity (such as the secured entity 106 (FIG. 1)). The origination device may share the credential with the recipient device via the signals and operations illustrated in the signal flow 1300.

The signal flow 1300 may further include a communication application 1304. The communication application 1304 may include one or more of the features of the communication application 1304. The communication application 1304 may comprise an application executed on the origination device that can be utilized by the origination device to communicate with another device. For example, the communication application 1304 may comprise a text messaging application in some embodiments. Some examples of the communication application 1304 may include short message service (SMS), multimedia messaging service (MMS), WhatsApp, Signal, Telegram, iMessage, Google Messages, and other messaging services. The origination device may utilize the communication application 204 to communicate with communication applications executing on other devices.

The signal flow 1300 may include a provisioning server 1306. The provisioning server 1306 may include one or more of the features of the provisioning server 206 (FIG. 2). The provisioning server 1306 may be associated with the origination device and may be responsible for provisioning credentials to the user information application 1302 of the origination device. For example, the provisioning server 1306 may have provisioned the credential to the user information application 1302 for accessing the secured entity. In some embodiments, the provisioning server 1306 may comprise an Android Broker, an Apple Broker, or another provisioning server.

The signal flow 1300 may include a push notification system 1308. The push notification system 1308 may include one or more of the features of the push notification system 208 (FIG. 2). The push notification system 1308 may be utilized for issuing pushes for the origination device and/or issuing pushes between the origination device and one or more other devices. For example, the push notification system 1308 may provide messages to the origination device that can cause the origination device to perform an operation, such as display a user interface pop up in a heads-up manner on the origination device in response to the origination device detecting the messages and/or perform another operation.

The signal flow 1300 may include a relay server 1310. The relay server 1310 may include one or more of the features of the relay server 210 (FIG. 2). The relay server 1310 may be associated with the origination device and may facilitate the sharing of credentials with devices executing different platforms. The relay server 1310 may receive data from the origination device and make the data available to devices executing other platforms. For example, the relay server 1310 may receive the data from the origination device and may convert the data to a format for a different platform requesting the data. For example, the relay server 1310 may receive a token from the user information application 1302 and convert the token for a different platform when another device retrieves the token.

The signal flow 1300 may include a credential manager 1312. The credential manager 1312 may include one or more of the features of the credential manager 212 (FIG. 2). The credential manager 1312 may include one or more of the features of the credential manager 108 (FIG. 1). The credential manager 1312 may be associated with one or more secured entities (such as the secured entity 106) and may generate, store, and/or assign one or more credentials (such as the credential 110 (FIG. 1)) for the secured entities. For example, the credential manager 1312 may have assigned the credential to the user information application 1302 of the origination device that is to be shared with the recipient device via the signals and/or operations of the signal flow 1300.

The signal flow 1300 may include a push notification system 1314. The push notification system 1314 may include one or more of the features of the push notification system 214 (FIG. 2). The push notification system 1314 may be utilized for issuing pushes for the recipient device and/or issuing pushes between the recipient device and one or more other devices. The recipient device may be, or may include one or more of the features of, the recipient device 104 (FIG. 1). The push notification system 1314 may provide messages to the recipient device that can cause the recipient device to perform an operation, such as display a user interface pop up in a heads-up manner on the recipient device in response to the recipient device detecting the messages and/or perform another operation.

The signal flow 1300 may include a web application 1316. The web application 1316 may include one or more of the features of the web application 216 (FIG. 2). The web application 1316 may facilitate provisioning of credentials into a user information application 1322 of the recipient device. For example, the web application 1316 may communicate with the credential manager 1312 to facilitate sharing the credential with the recipient device.

The signal flow 1300 may include a provisioning server 1318. The provisioning server 1318 may include one or more of the features of the provisioning server 218 (FIG. 2). The provisioning server 1318 may be associated with the recipient device and may be responsible for provisioning credentials to the user information application 21322 of the recipient device. In some embodiments, the provisioning server 1318 may comprise an Android Broker, an Apple Broker, or another provisioning server. The recipient device may be executing a different platform than the origination device and the provisioning server 1318 may be provisioning in accordance with the platform executed by the recipient device. For example, if the provisioning server 1306 is an Android Broker, the provisioning server 1318 may be an Apple Broker in some embodiments.

The signal flow 1300 may include a communication application 1320. The communication application 1320 may include one or more of the features of the communication application 220 (FIG. 2). The communication application 1320 may comprise an application executed on the recipient device that can be utilized by the recipient device to communicate with another device. For example, the communication application 1320 may comprise a text messaging application in some embodiments. Some examples of the communication application 1320 may include short message service (SMS), multimedia messaging service (MMS), WhatsApp, Signal, Telegram, iMessage, Google Messages, and other messaging services. The recipient device may utilize the communication application 1320 to communicate with communication applications executing on other devices.

The signal flow 1300 may include a user information application 1322 being executed by the recipient device. The user information application 1322 may include one or more of the features of the user information application 222 (FIG. 2). In some embodiments, the user information application 1322 may be a wallet application, where the wallet application may retrieve account information and/or balance information from a credential manager and represent the account information and/or the balance information on the recipient device. The recipient device may be, or may include one or more of the features of, the recipient device 104. The recipient device may execute a different platform than the origination device. The user information application 1322 may be a user information application for the platform executed by the recipient device, whereas the user information application 1302 may be a user information application for the platform executed by the origination device. The user information application 1322 may store one or more credentials that allow the recipient device to access a secured entity.

In 1324, the user information application 1302 of the origination device may detect a user interaction from a user of the origination device that indicates the user desires to share a credential. For example, the user information application 1302 may be executed by the origination device and may present a user interface on a display of the origination device. The origination device may detect a user indication with the user interface displayed by the origination device that indicates the user desires to share a credential.

In 1326, the user information application 1302 may read shareable entitlements from the origination device. For example, the user information application 1302 may determine credentials that are available in the user information application 1302, which may be one or more of the credentials stored by the origination device. From the credentials, the user information application 1302 may determine which of the credentials are shareable. For example, stored data associated with the credentials may indicate which of the credentials are shareable in some embodiments.

In 1328, the user information application 1302 may present indications of the shareable credentials to the user of the origination device. In particular, the user information application 1302 may display a user interface on the display of the origination device that indicates the credentials available in the user information application 1302 that are shareable. The user interface may allow the user to select one or more of the shareable credentials to be shared by the user information application 1302.

In 1330, the user information application 1302 may detect a user interaction from the user that indicates which of the shareable credentials the user selects to share. For example, the user may interact with the user interface display by the user information application in 1328 to indicate which of the displayed shareable credentials the user selects to share. The origination device may detect the user interaction and the user information application 1302 may determine which credentials are to be shared based on the user interaction. In some embodiments, the user may further define limitations for sharing of the credentials. For example, the user may indicate a time period for which the sharing of the credentials is to remain valid, times of day and/or week that a device with which the credentials are being shared may utilize the credentials, a particular entity access point (for example, if a secured entity includes multiple entity access points (such as multiple doors), a particular entity access point (such as a certain door of the multiple doors) may be defined for providing access to the secured entity), or other limitations for the use of the credentials.

In 1332, the user information application 1302 may detect a user interaction from the user indicating that the sharing of the selected credentials is to be initiated. For example, the user may interact with a user interface displayed on the display of the origination device that indicates that the user information application 1302 is to share the selected credentials. The user information application 1302 may detect the user interaction and initiate the procedure for sharing the credentials.

In 1334, a credential authority operation may be performed. In some embodiments where the credential is maintained by the credential manager 1312, the credential authority operation may be defined by the credential manager 1312 and may be utilized by the credential manager 1312 to verify that the originating device has authorization to share the credential. For example, the credential authority operation may result in the credential manager 1312 receiving information related to the originating device that the credential manager 1312 can utilize to determine whether the originating device is authorized to share the credential. In some embodiments where the credential manager 1312 determines that the origination device is authorized to share the credential, the credential manager 1312 may provide a share voucher (which may also be referred to as a token) to the origination device as part of the credential authority operation, where the share voucher may be utilized to share the credential with the recipient device. The user information application 1302 may further generate a pin code that can be utilized for sharing the credential with the recipient device as part of the credential authority operation.

In other embodiments where the credential is maintained by the originating device, the user information application 1302 may generate a share voucher. The share voucher may be utilized to share the credential with the recipient device. The user information application 1302 may further generate a pin code that can be utilized for sharing the credential with the recipient device as part of the credential authority operation.

In 1336, the user information application 1302 may generate a key. The key generated by the user information application 1302 may be a relay symmetric key. In some embodiments, the key may be an AES key. The user information application 1302 may derive the key from salt and/or a number of iterations.

In 1338, the user information application 1302 may securely store the key with a mailbox ID. 1338 may be performed as part of a stateful key exchange for stateful credential sharing. 1338 may be omitted in stateless credential sharing. The key may be utilized to encrypt stateful payloads in the stateful credential sharing. The user information application 1302 may store the key in a secure element of the origination device, where the secure element may comprise a chip within the origination device that is designed to be protected from unauthorized access. The secure element may limit a set of applications that are allowed to access the chip and/or write to the chip.

Figure 14:
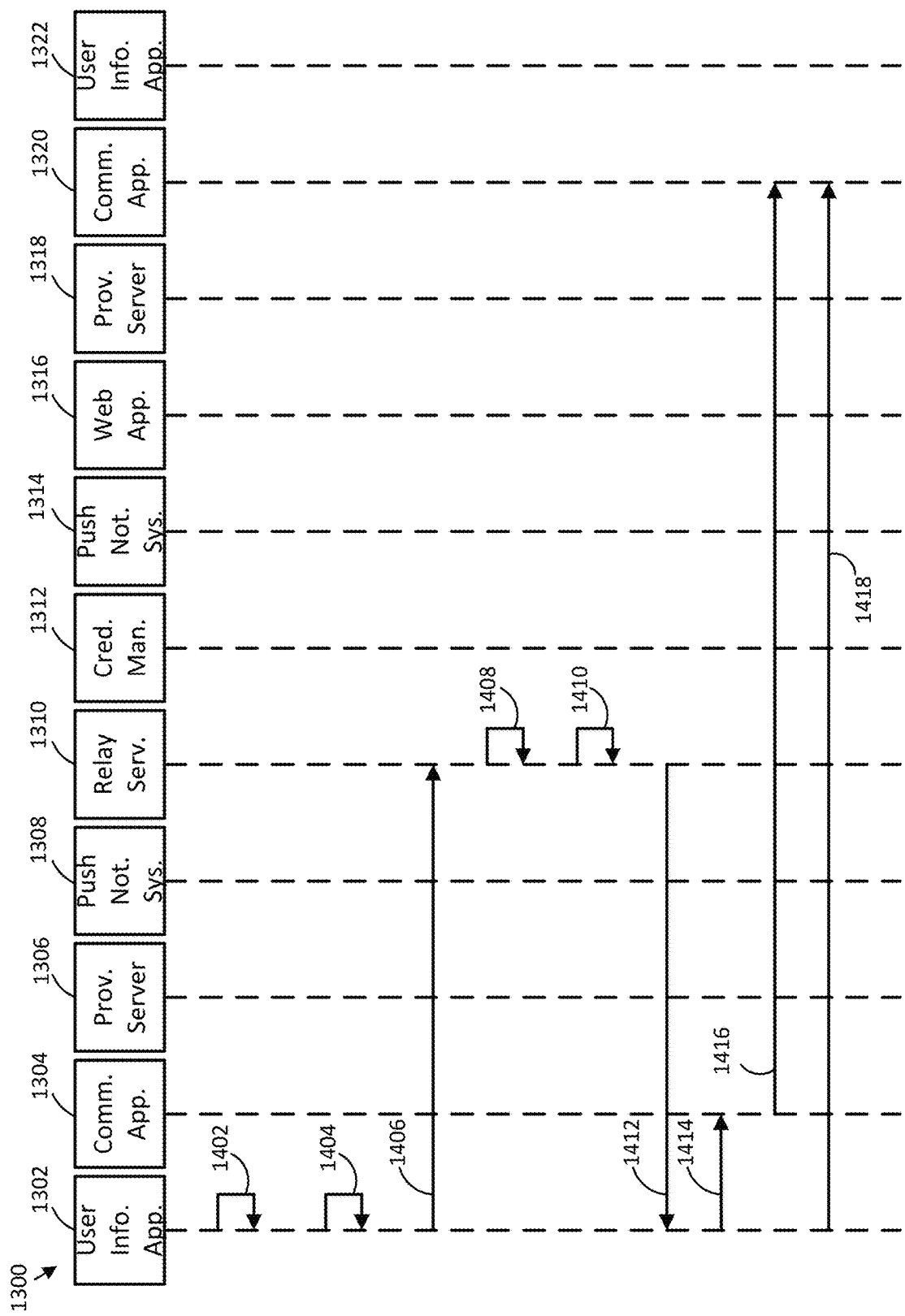
FIG. 14 illustrates a second portion of the example signal flow for sharing a credential in accordance with some embodiments.

FIG. 14 illustrates a second portion of the example signal flow 1300 for sharing a credential in accordance with some embodiments. In 1402, the user information application 1302 may generate an encrypted payload. The user information application 1302 may generate the encrypted payload by encrypting metadata and/or the pin code. The user information application 1302 may perform AES encryption with the bearer token and/or the sender push token to produce the encrypted payload. The encryption of the payload may prevent one or more of the entities (such as the provisioning server 1306, the relay server 1310, the web application 1316, and/or the provisioning server 1318) from being able to read bearer token and/or the sender push token. In some embodiments, 1402 may be omitted.

In 1404, the user information application 1302 may generate an encrypted payload. The user information application 1302 may generate the encrypted payload by encrypting metadata. The user information application 1302 may perform AES encryption with the bearer token and/or the sender push token to produce the encrypted payload. The encryption of the payload may prevent one or more of the entities (such as the provisioning server 1306, the relay server 1310, the web application 1316, and/or the provisioning server 1318) from being able to read bearer token and/or the sender push token. In some embodiments, 1404 may be omitted. In some embodiments, 1402 and 1404 may be performed in the alternative, where 1402 may be performed in some embodiments and 1404 may be performed in other embodiments.

In 1406, the user information application 1302 may provide the encrypted payload and/or display information to the relay server 1310. The user information application 1302 may further provide configuration information, the mailbox ID, and/or a sender push token along with the encrypted payload and/or the metadata. The configuration information may indicate authorization policies to be implemented by the relay server 1310 when sharing the credentials. The available policies may include stateless (which may allow a single write), stateful (which may allow two writes), and/or long lived (which may allow infinite writes, signatures).

In some embodiments, the user information application 1302 may further provide an attestation in 1406. The attestation may comprise a signature applied to the data, or some portion thereof, transmitted in 1406. The attestation may be associated with the origination device executing the user information application 1302 and may be utilized for determining that the origination device is a valid device for requesting the sharing of the credential. The attestation may limit or be devoid of information that can identify a user of the origination device. Accordingly, the relay server 1310 may be unable to identify a user of the origination device based on the attestation, which can protect the identity of the user and/or credentials associated with the user. The relay server 1310 may utilize the attestation to determine that the device requesting the sharing of the credential is a type of device that is authorized to share the credential. For example, the relay server 1310 may be aware that a smartphone device is authorized to share the credential. If the relay server 1310 determines that the device requesting the sharing of the credential is a smartphone device based on the attestation, the relay server 1310 may allow the signal flow 1300 to continue. However, if the relay server 1310 determines that the device requesting the sharing of the credential is another type of device (such as another server), the relay server 1310 may terminate the signal flow 1300. In some embodiments, the attestation may be omitted.

In 1408, the relay server 1310 may convert the display information to rich object data. The display information may include an indication of the secured entity to which the credential can provide access. A device may utilize the rich object data to display an indication of the secured entity on the device.

In 1410, the relay server 1310 may store the mailbox ID, the display information, the metadata, the sender push token, and/or the rich object data produced from the metadata in a location associated with the mailbox ID. For example, the relay server 1310 may store the display information, the metadata, the sender push token, and/or the rich object data produced from the metadata, where the location can be identified based on the mailbox ID. Further, the relay server 1310 may associate the authorization policy indicated by the configuration information with the storage location, such that the relay server 1310 may apply the authorization policy for any device attempting to access the storage location via the mailbox ID.

In 1412, the relay server 1310 may provide a universal share URL to the user information application 1302. The universal share URL may correspond to the storage location associated with the mailbox ID. A device that enters the universal share URL may be directed to the storage location and may, when authenticated, be able to retrieve information from the storage location. The relay server 1310 may provide the universal share URL to the user information application 1302 for sharing with the recipient device to retrieve the display information, the metadata, the sender push token, and/or the rich object data stored in the storage location.

In 1414, the user information application 1302 may launch the communication application 1304 for sharing the universal share URL received in 1412 and/or the relay symmetric key generated in 1336. For example, the user information application 1302 may cause the universal share URL and/or the relay symmetric key to be provided to the communication application 1304 for sharing with another device, such as the recipient device. The user information application 1302 may transmit the password out of band for increased security. For example, the user information application 1302 may transmit the relay symmetric key in a different communication from the token to provide for increased security.

In 1416, the communication application 1304 associated with the origination device may transmit the universal share URL and/or the relay symmetric key to the communication application 1320 associated with the origination device. For example, the communication application 1304 being executed by the origination device may transmit the universal share URL and/or the relay symmetric key in a message to the communication application 1320 being executed by the recipient device.

In 1418, the user information application 1302 may provide pin code and/or a pin code URL to the communication application 1320. The user information application 1302 may provide the pin code and/or the pin code URL over another channel from the universal share URL and/or the relay symmetric key transmitted in 1416. The pin code and/or the pin code URL may be sent via an application supported by both the originating device and the recipient device, such as What's App, short message service (SMS), and/or electronic mail (Email).

Figure 15:
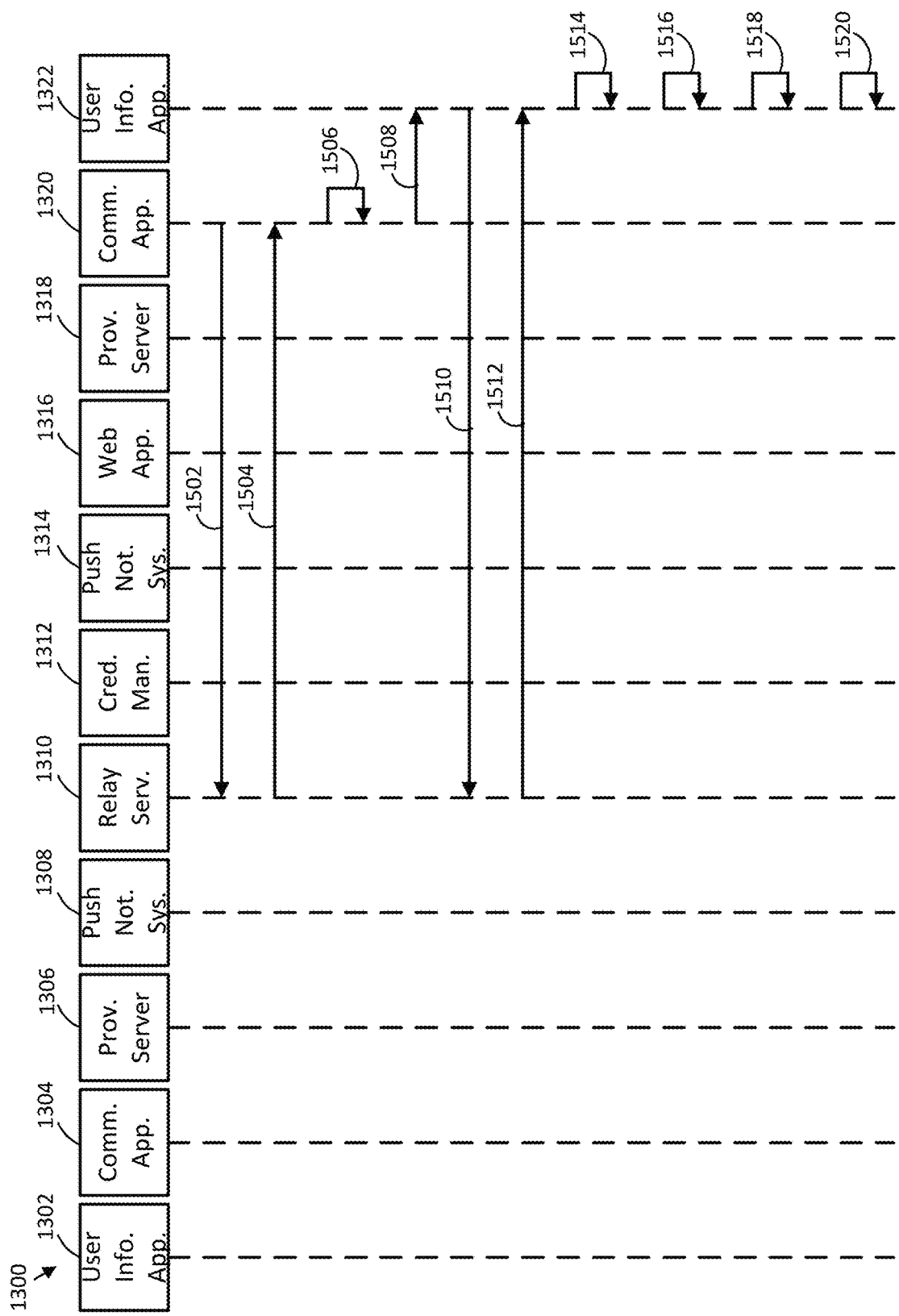
FIG. 15 illustrates a third portion of the example signal flow for sharing a credential in accordance with some embodiments.

FIG. 15 illustrates a third portion of the example signal flow 1300 for sharing a credential in accordance with some embodiments. In 1502, the communication application 1320 associated with the recipient device may utilize the universal share URL received in 1416 to request information from the relay server 1310 associated with mailbox ID. For example, the communication application 1320 may transmit a request to the relay server 1310 to provide at least a portion of the information associated with the universal share URL, which may be the storage location on the relay server 1310 associated with the mailbox ID.

In 1504, the relay server 1310 may provide the display information to the communication application 1320. For example, the relay server 1310 may retrieve the display information from the storage location based on the request received in 1502 and transmit the display information to the communication application 1320 being executed on the recipient device.

In 1506, the communication application 1320 may display a snapshot corresponding to the rich object data on the display of the recipient device. For example, the rich object data may include an indication of the secured entity for which the shared credential may provide access. The communication application 1320 may cause the indication of the secured entity to be displayed on the display of the device. The indication may include a description of the secured entity, an image associated with the secured entity, or some other visual representation related to the secured entity that may be displayed on the display of the recipient device.

In 1508, the communication application 1320 may provide the universal share URL and/or the password received in 1418 to the user information application 1322 executing on the recipient device. In some embodiments, the communication application 1320 may provide the universal share URL and/or the password to the user information application 1322 based on a user interaction with the indication of the secured entity displayed on the display of the device in 1506. The communication application 1320 may cause the user information application 1322 to launch along with providing in the universal share URL and/or the password.

In 1510, the user information application 1322 may transmit a request to the relay server 1310 to provide the information from the mailbox. For example, the user information application 1322 may transmit a request that includes the mailbox ID indicating the mailbox from which the data is being requested.

In 1512, the relay server 1310 may provide the rich object data generated from the metadata and/or the encrypted payload to the user information application 1322. The relay server 1310 may provide the rich object data and/or the encrypted payload based on the reception of the request received from the user information application 1322 in 1510.

In 1514, the user information application 1322 may generate a key. In particular, the user information application 1322 may generate the key based on the rich object data, the salt, the mailbox ID, the relay password, and/or the iterations. The key may be a symmetric key in some embodiments. The user information application 1322 may derive an AES key from the rich object data, the salt, the mailbox ID, the password, and/or the iterations to produce the key.

In 1516, the user information application 1322 may decrypt the encrypted payload received in 1512 with the key generated in 1514. The user information application 1322 may produce the share voucher and/or the pin code by decrypting the encrypted payload.

1518 through 1710 (FIG. 17) may be performed in some instances and may be omitted in other instances. For example, 1518 through 1710 may be performed for stateful key exchanges, whereas 1518 through 1710 may be omitted for stateless key exchanges. Whether the exchange is stateful or stateless may be defined based on configuration defined in 1406.

In 1518, the user information application 1322 may securely store the key produced in 1514 with association to the mailbox ID. The user information application 1322 may store the key in a secure element of the recipient device.

In 1520, the user information application 1322 may generate a key pair. For example, the user information application 1322 may generate the key pair based on the metadata for provisioning information in accordance with key requirements. The key pair may be an asymmetric key pair in some embodiments, where the asymmetric key pair may comprise a public key and a corresponding private key. The public key may be referred to as a transaction key.

Figure 16:
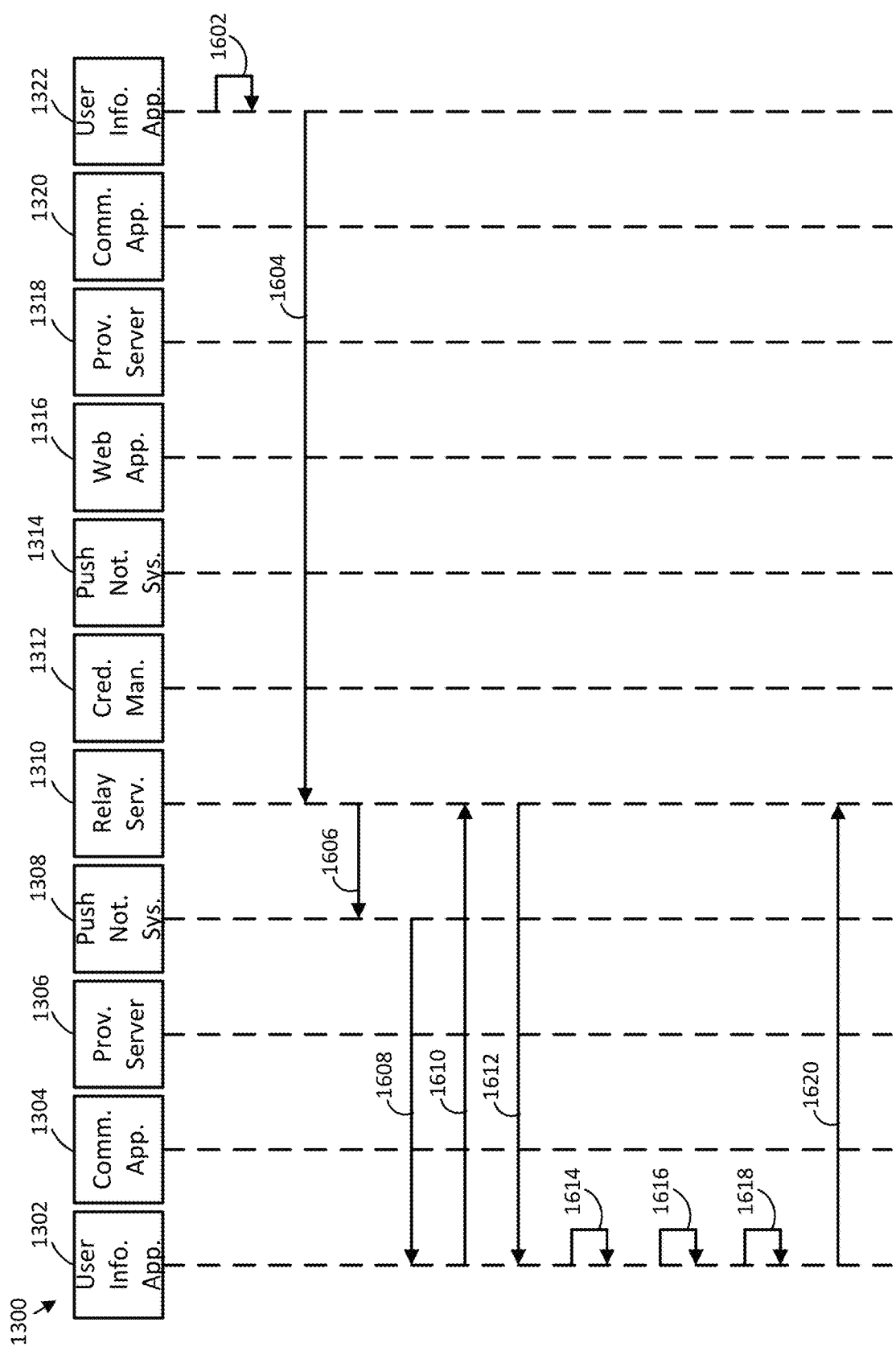
FIG. 16 illustrates a fourth portion of the example signal flow for sharing a credential in accordance with some embodiments.

FIG. 16 illustrates a fourth portion of the example signal flow 1300 for sharing a credential in accordance with some embodiments. In 1602, the user information application 1322 may encrypt the transaction key of the key pair generated in 1520. The user information application 1322 may perform AES encryption with the public key of the key pair.

In 1604, the user information application 1322 may transmit the public key of the key pair generated in 1520 to the relay server 1310. For example, the user information application 1322 may transmit the encrypted public key, which was encrypted in 1602, to the relay server 1310. The user information application 1322 may further transmit the mailbox ID and/or the sender push token to the relay server 1310 with the encrypted public key. The relay server 1310 may store the encrypted public key based on the reception of the encrypted public key.

In some embodiments, the user information application 1322 may further provide an attestation in 1604. The attestation may comprise a signature applied to the data, or some portion thereof, transmitted in 1604. The attestation may be associated with the recipient device executing the user information application 1322 and may be utilized for determining that the recipient device is a valid device for obtaining the shared credential. The attestation may limit or be devoid of information that can identify a user of the recipient device. Accordingly, the relay server 1310 may be unable to identify a user of the recipient device based on the attestation, which can protect the identity of the user and/or credentials associated with the user. The relay server 1310 may utilize the attestation to determine that the device requesting the shared credential is a type of device that is authorized to receive the credential. For example, the relay server 1310 may be aware that a smartphone device is authorized to receive the credential. If the relay server 1310 determines that the device requesting the credential is a smartphone device based on the attestation, the relay server 1310 may allow the signal flow 1300 to continue. However, if the relay server 1310 determines that the device requesting the credential is another type of device (such as another server), the relay server 1310 may terminate the signal flow 1300. In some embodiments, the attestation may be omitted.

In 1606, the relay server 1310 may request a push notification from the push notification system 1308 associated with the origination device. The push notification request may include the mailbox ID, the sender push token, and/or the public key. The push notification request may request that the push notification system 1308 provide a push notification to the user information application 1302 that indicates a recipient device is attempting to retrieve the shared credential.

In 1608, the push notification system 1308 may send a push notification to the user information application 1302 on the origination device. The push notification may cause a user interface to be displayed on a display of the origination device. The user interface displayed on the origination device may indicate that a recipient device is attempting to retrieve the shared credential. In some embodiments, the user interface displayed on the origination device may further request input from a user of the origination device to indicate that the recipient device is authorized to receive the shared credential. By utilizing the push notification system 1308, the notification may be provided when recipient device is attempting to retrieve the credential and/or as soon as the origination device is available to receive push notifications after the recipient device has attempted to retrieve the credential.

In 1610, the user information application 1302 may send a request to the relay server 1310 to retrieve information from the relay server 1310. The information requested by the user information application 1302 may include the encrypted public key that was stored in 1604.

In 1612, the relay server 1310 may transmit information to the user information application 1302 based on the request from 1610. For example, the relay server 1310 may transmit the encrypted public key to the user information application 1302.

In 1614, the user information application 1302 may decrypt the information received from the relay server 1310. For example, the user information application 1302 may decrypt the transaction key received in 1612. Decrypting the transaction key may produce the transaction key.

In 1616, the user information application 1302 may generate a signature. For example, the wallet key may generate a signature based on the transaction key and/or the mailbox ID. The signature may cover the transaction key that was produced through the decryption in 1614. In some embodiments, the signature may include an attestation, a token, and/or entitlements. In some embodiments, the signature may be used in place of the bearer token going forward in the signal flow 1300.

In 1618, the user information application 1302 may encrypt the signature to produce an encrypted payload. For example, the user information application 1602 may encrypt the signature generated in 1616 using AES encryption to produce the encrypted payload.

In 1620, the user information application 1302 may provide the encrypted payload to the relay server 1310 for storage. The user information application 1302 may further provide the receiver push token, and/or the mailbox ID to the relay server 1310 with the encrypted payload. The relay server 1310 may store the encrypted payload when received. For example, the relay server 1310 may store the encrypted payload in a storage location corresponding to the mailbox ID. Due to the encrypted payload being encrypted, the relay server 1310 may be unable to read the data within the encrypted payload.

Figure 17:
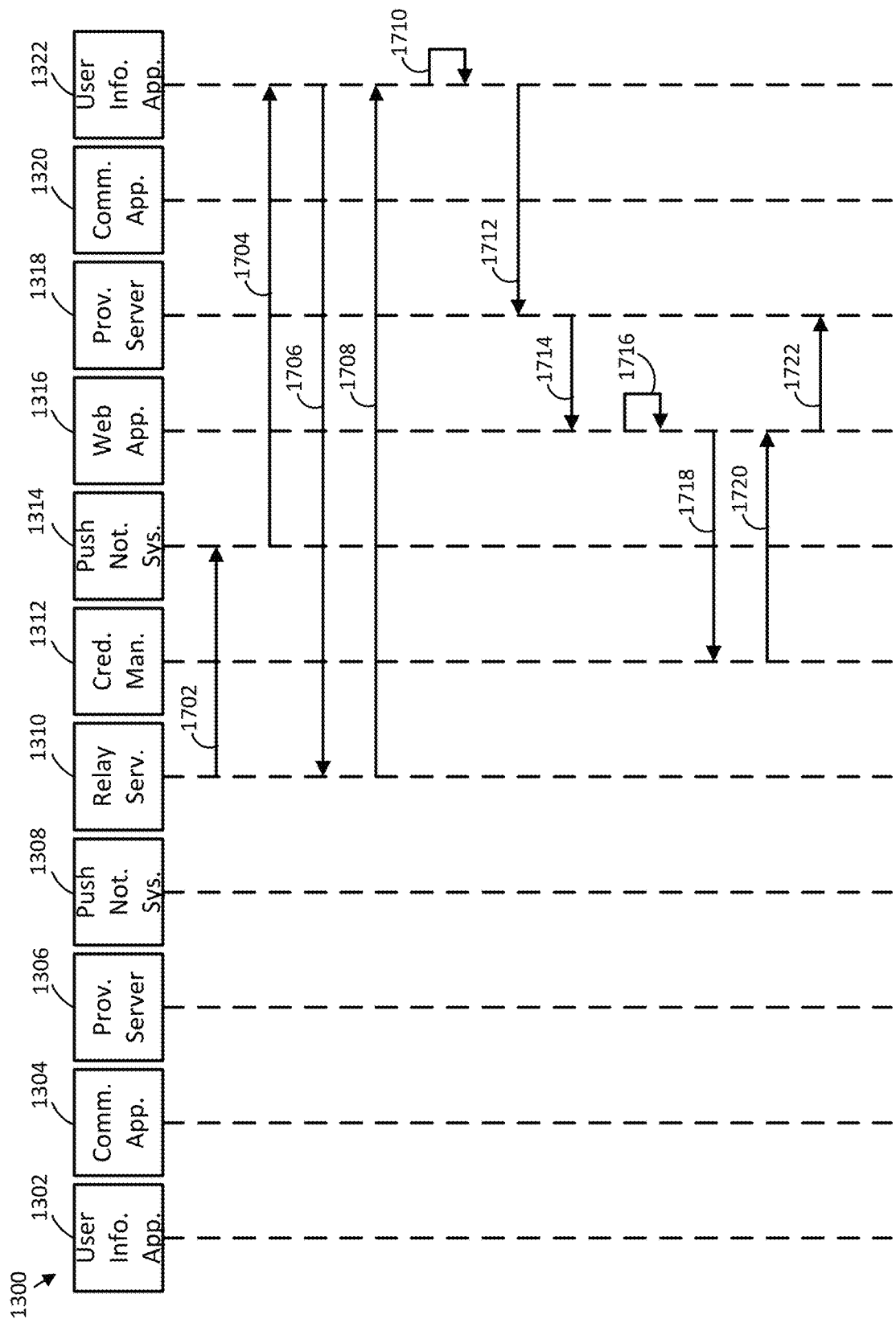
FIG. 17 illustrates a fifth portion of the example signal flow for sharing a credential in accordance with some embodiments.

FIG. 17 illustrates a fifth portion of the example signal flow 1300 for sharing a credential in accordance with some embodiments. In 1702, the relay server 1310 may transmit a request for a push notification to the push notification system 1314 associated with the recipient device. The request may include the mailbox ID and/or the receiver push token.

In 1704, the push notification system 1314 may transmit a push notification to the user information application 1322 executed by the recipient device. The push notification system 1314 may transmit the push notification based on the request for the push notification received by the push notification system in 1702. The push notification may cause a user interface to be displayed on a display of the recipient device. The push notification may include the mailbox ID and/or the receiver push token.

In 1706, the user information application 1322 may transmit a request for information to the relay server 1310. For example, the user information application 1322 may transmit a request for the relay server 1310 to provide at least a portion of the information stored in the storage location corresponding to the mailbox ID.

In 1708, the relay server 1310 may transmit the encrypted payload stored in the storage location corresponding to the mailbox ID to the user information application 1322. For example, the relay server 1310 may transmit the encrypted payload stored in 1620 to the user information application 1322. The encrypted payload may include the encrypted signature.

In 1710, the user information application 1322 may decrypt encrypted payload received from the relay server 1310 in 1708. For example, the user information application 1322 may perform AES decrypting with the encrypted payload. The decryption of the encrypted payload may produce the signature.

1712 through 1904 (FIG. 19) may be performed in some instances and may be omitted in other instances. For example, 1712 through 1904 may be performed for stateless key exchanges, whereas 1712 through 1904 may be omitted for stateful key exchanges. Whether the exchange is stateful or stateless may be defined based on configuration defined in 1406.

In 1712, the user information application 1322 of the recipient device may provide a request to the provisioning server 1318 to retrieve the credential. The request may include an indication of the provisioning target (which may be the credential) and/or provisioning information (which may be information related to the credential). The request may further include a pin code that a user of the recipient device may have input to the recipient device and/or that is associated with a URL selected by the user on the recipient. The provisioning server 1318 may utilize the pin code along with the provisioning target to determine whether the user of the recipient device is authorized to retrieve the credential.

In 1714, the provisioning server 1318 may provide a redemption request for the credential to the web application 1316. The redemption request may include an indication of the provisioning target and/or the pin code.

In 1716, the web application 1316 may determine a partner corresponding to the redemption request. For example, the web application 1316 may determine the credential manager corresponding to the credential to be retrieved.

In 1718, the web application 1316 may provide a credential request to the credential manager 1312. The credential request may indicate that the web application 1316 and/or the user information application 1322 is requesting the credential. The credential request may include a sharing instance ID, a provisioning credential ID, and/or a pin code.

In 1720, the credential manager 1312 may provide information for the credential manager 1312 to verify the recipient device and/or the user is authorized to retrieve the credential to the web application 1316. The information may include encrypted card fields, requirements for credential retrieval, a provisioning bundle ID, and/or a FIDO profile for verifying the authorization.

In 1722, the web application 1316 may provide the information received in 1720 to the provisioning server 1318. For example, the web application 1316 may provide the encrypted card fields, the requirements for credential retrieval, the provisioning bundle ID, and/or the FIDO profile to the provisioning server 1318.

Figure 18:
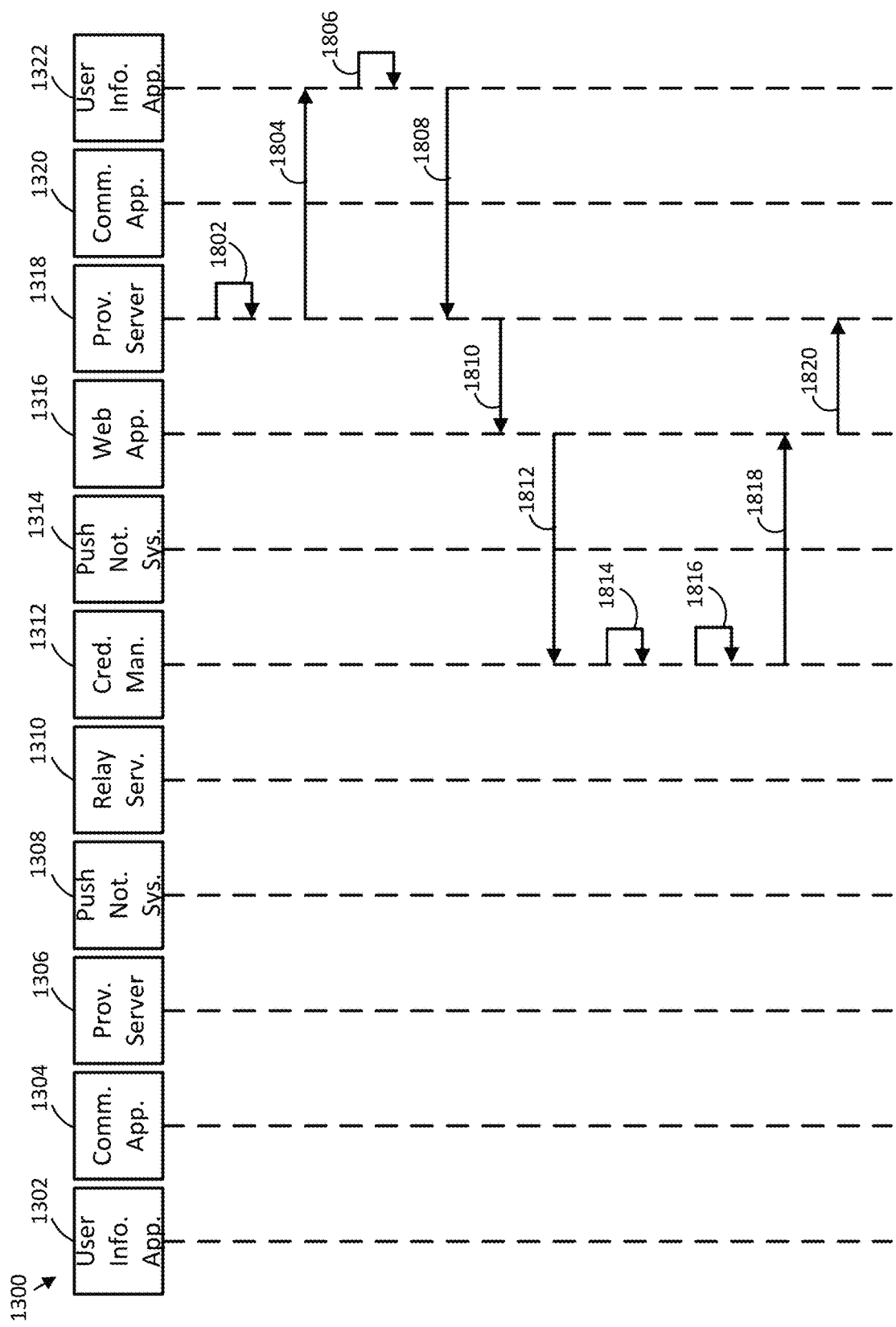
FIG. 18 illustrates a sixth portion of the example signal flow for sharing a credential in accordance with some embodiments.

FIG. 18 illustrates a sixth portion of the example signal flow 1300 for sharing a credential in accordance with some embodiments. In 1802, the provisioning server 1318 may create a card session. The card session may be utilized for provisioning the credential to the user information application 1322. The provisioning server 1318 may further generate a card session ID corresponding to the card session.

In 1804, the provisioning server 1318 may provide authentication generation information to the user information application 1322. For example, the authentication generation information may indicate the information to be produced by the user information application to be utilized for verifying authorization by the credential manager 1312. The authentication generation information may include the card session identifier, the requirements, a privacy key generation indication, a generate FIDO indication, and/or a transmission key generation indication.

In 1806, the user information application 1322 may generate one or more keys. For example, the user information application 1322 may generate one or more keys in accordance with the authentication generation information received in 1804. The keys generate may include a privacy key, a transmission key, and/or FIDO information.

In 1808, the user information application 1322 may transmit an enable card request to the provisioning server 1318. The enable card request may include the card session identifier, the privacy key, the transmission key, and/or the FIDO information. The enable card request may request enablement of the card session.

In 1810, the provisioning server 1318 may request a provisioning bundle associated with the credential from the web application 1316. The provisioning bundle request may include a provisioning bundle ID, the privacy key, the transmission key, and/or the FIDO information.

In 1812, the web application 1316 may provide the provisioning bundle request to the credential manager 1312. The provisioning bundle request may request that the credential manager provide a copy of the credential to the user information application 1322. The provisioning bundle request may include the provisioning bundle ID, the privacy key, the transmission key, and/or the FIDO information.

In 1814, the credential manager 1312 may verify the authorization for credential. For example, the credential manager 1312 may verify that the user and/or the recipient device is authorized to receive the credential. The credential manager 1312 may determine the provisioning bundle corresponding to the credential for which authorization is being sought based on the provisioning bundle ID. The credential manager 1312 may determine whether the user and/or recipient device is authorized based on the FIDO information, privacy key, and/or the transmission key. The signal flow 1300 may proceed if it is determined that the user and/or the recipient device is authorized to retrieve the credential. If the credential manager 1312 determines that the user and/or the recipient device is not authorized to retrieve the credential, the signal flow 1300 may be terminated.

In 1816, the credential manager 1312 may store the keys. For example, the credential manager 1312 may store the keys received in 1812. The keys stored may include the privacy key and/or the transmission key.

In 1818, the credential manager 1312 may provide credential information to the web application 1316. The credential information may include information for provisioning the credential to the user information application 1322. For example, the credential information may include a bundle corresponding to the credential and/or device encrypted entitlements.

In 1820, the web application 1316 may provide credential provisioning information to the provisioning server 1318. The credential provisioning information may include pass data for creating a pass related to the credential for the user information application 1322. The credential provisioning information may further include encrypted entitlements.

Figure 19:
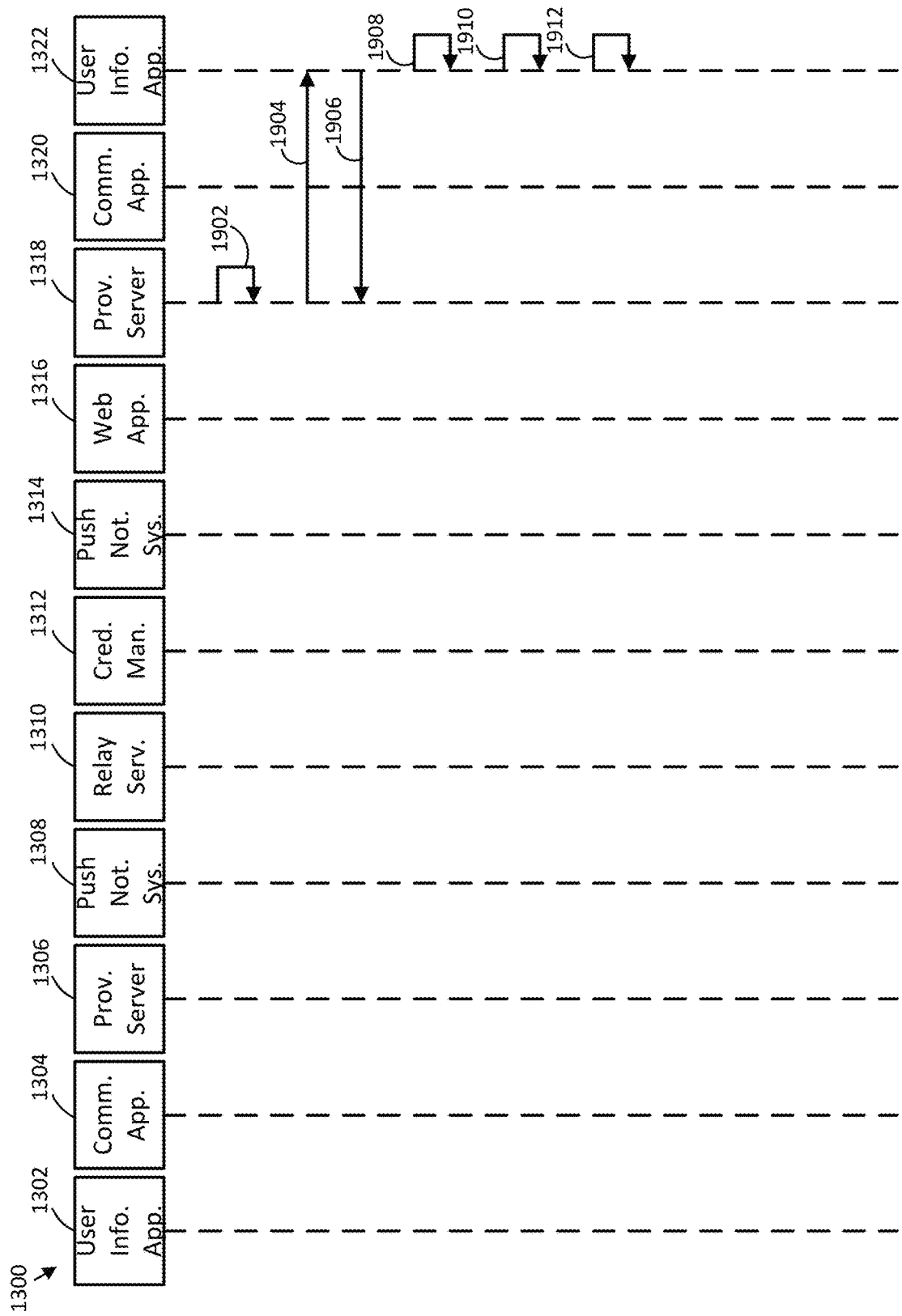
FIG. 19 illustrates a seventh portion of the example signal flow for sharing a credential in accordance with some embodiments.

FIG. 19 illustrates a seventh portion of the example signal flow 1300 for sharing a credential in accordance with some embodiments. In 1902, the provisioning server 1318 may create a pass. For example, the provisioning server 1318 may create a pass corresponding to the credential.

In 1904, the provisioning server 1318 may provide a credential URL to the user information application 1322 being executed by the recipient device. The credential URL may indicate a location from which the user information application 1322 can retrieve the credential.

In 1906, the user information application 1322 may download the credential from the provisioning server 1318. For example, the user information application 1322 may access the credential from the location on the provisioning server 1318 indicated by the credential URL. The user information application 1322 store the credential, thereby providing the recipient device with the shared credential.

In 1908, the user information application 1322 may download an encrypted sharing bundle. For example, the user information application 1322 may download an encrypted sharing bundle related to the credential. The encrypted sharing bundle may include encrypted information for indicating the credential and/or the secured entity to a user of the recipient device.

In 1910, the user information application 1322 may decrypt the encrypted sharing bundle. For example, the user information application 1322 may decrypt the encrypted sharing bundle downloaded in 1908 to produce the sharing bundle. The sharing bundle may include information for indicating the credential and/or the secured entity. For example, the sharing bundle may include images data and/or textual data that may be rendered within the user information application 1322 to produce images and/or text that can be displayed in a user interface of the user information application 1322.

In 1912, the user information application 1322 may store the sharing bundle. For example, the user information application 1322 may store the sharing bundle in the secured element of the recipient device. The stored sharing bundle may allow the user information application 1322 to display an indication of the credential and/or the secured entity for selection by the user of the recipient device. In some embodiments, the recipient device may detect a user interaction with the indication of the credential and/or the secured entity and may cause the secured entity to provide access to the user of the recipient device. In other embodiments, the secured entity may provide access based on the secured entity determining that the recipient device is located within a proximity of the secured entity and the recipient device has the credential and/or the sharing bundle stored on the recipient device.

Figure 20:
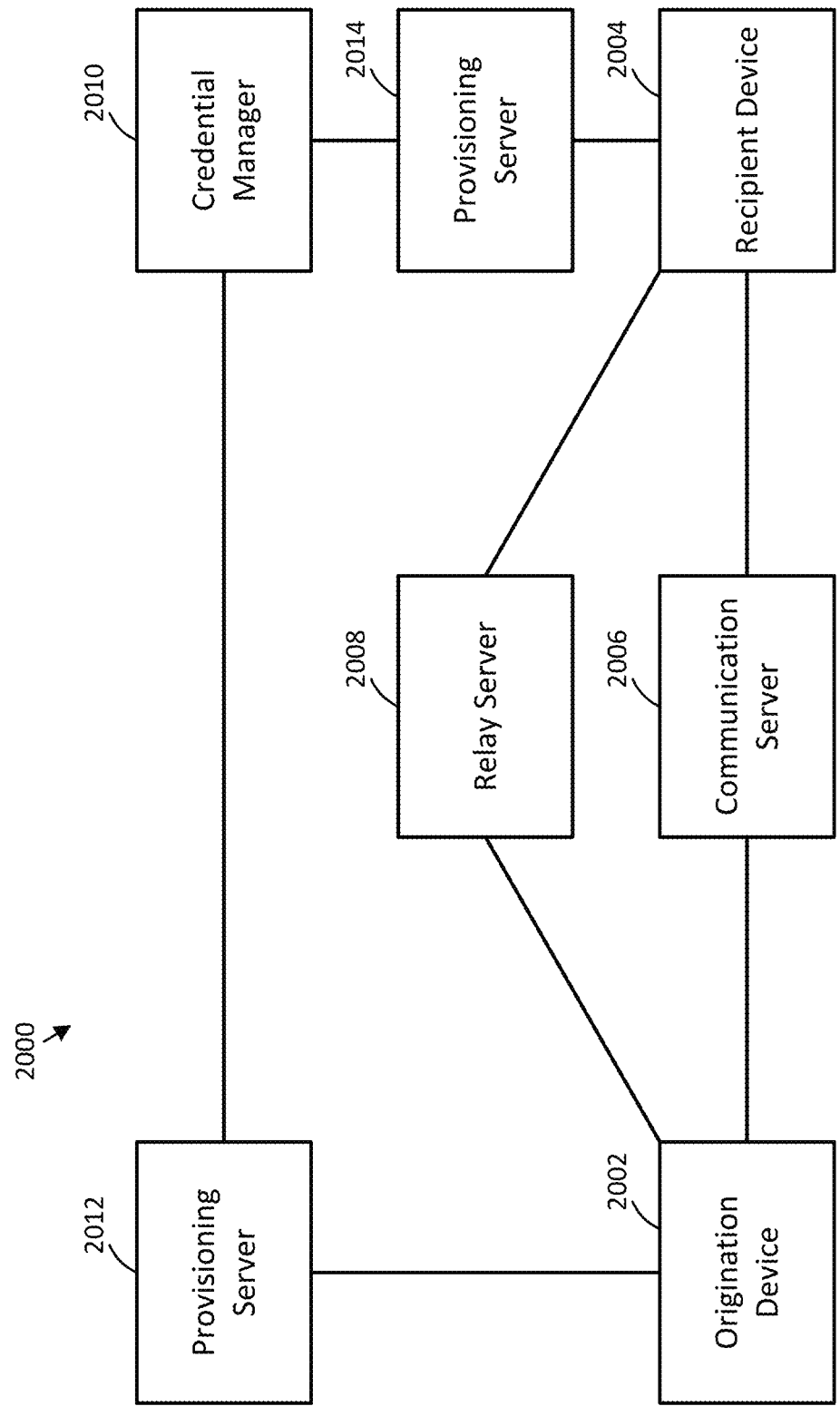
FIG. 20 illustrates an example system arrangement in accordance with some embodiments.

FIG. 20 illustrates an example system arrangement 2000 in accordance with some embodiments. For example, the system arrangement 2000 may implement signal flows (such as the signal flow 200 (FIG. 2) and/or the signal flow 1300 (FIG. 13)) and/or procedures (such as the procedure 900 (FIG. 9), the procedure 1000 (FIG. 10), and/or the procedure 1100 (FIG. 11)) described throughout this disclosure.

The system arrangement 2000 may include an origination device 2002. The origination device 2002 may include one or more of the features of origination devices (such as the origination device 102 (FIG. 1)) and/or the UEs (such as the UE 1200 (FIG. 12)) described throughout this disclosure. Further, the origination device 2002 may execute user information applications (such as the user information application 202 (FIG. 2) and/or the user information application 1302 (FIG. 13)) and/or communication applications (such as the communication application 204 (FIG. 2) and/or the communication application 1304 (FIG. 13)). The origination device 2002 may have a credential that provides access to a secured entity. The origination device 2002 may be able to share the credential with another device, where the other device may be executing a same platform or a different platform from the origination device 2002.

The system arrangement 2000 may include a recipient device 1004. The recipient device 2004 may include one or more of the features of the recipient devices (such as the recipient device 104 (FIG. 1)) and/or the UEs (such as the UE 1200 (FIG. 12)) described throughout this disclosure. Further, the recipient device 2004 may execute user information applications (such as the user information application 222 (FIG. 2) and/or the user information application 1322 (FIG. 13)) and/or communication applications (such as the communication application 220 (FIG. 2) and/or the communication application 1320 (FIG. 13)). The recipient device 2004 may be assigned the credential from the origination device 2002. The recipient device 2004 may execute a same platform or a different platform from the origination device 2002.

The system arrangement 2000 may include a communication server 2006. The communication server 2006 may be coupled to the origination device 2002 and the recipient device 2004 and may facilitate communication between the origination device 2002 and the recipient device 2004. For example, the communication server 2006 may support communication applications (such as the communication application 204 (FIG. 2), the communication application 220 (FIG. 2), the communication application 1304 (FIG. 13), the communication application 1320 (FIG. 13)) described throughout this application and may facilitate the exchange of communications between the communication applications.

The system arrangement 2000 may include a relay server 2008. The relay server 2008 may include one or more of the features of the relay servers (such as the relay server 210 (FIG. 2) and/or the relay server 1310 (FIG. 13)) described throughout this disclosure. The relay server 2008 may be coupled to the origination device 2002 and the recipient device 2004. The relay server 2008 may facilitate communications and/or operations described as being performed by relay servers throughout this disclosure.

The system arrangement 2000 may include a credential manager 2010. The credential manager 2010 may include one or more features of the credentials managers (such as the credential manager 108 (FIG. 1), the credential manager 212 (FIG. 2), the credential manager 1312 (FIG. 13)) described throughout this disclosure. The credential manager 2010 may manage one or more credentials, where the credentials may provide access to one or more secured entities. The credential manager 2010 may generate credentials and/or copies of the credentials that can be provided to devices (such as the origination device 2002 and/or the recipient device 2004) to provide the devices with access to one or more secured entities.

The system arrangement 2000 may include a first provisioning server 2012. The first provisioning server 2012 may include one or more of the features of the provisioning servers (such as the provisioning server 206 (FIG. 2), the provisioning server 218 (FIG. 2), the provisioning server 1306 (FIG. 13), and/or the provisioning server 1318 (FIG. 13)) described throughout the disclosure. The first provisioning server 2012 may be coupled to the origination device 2002. The first provisioning server 2012 may provision credentials (among other data and/or programs) to the origination device 2002. The first provisioning server 2012 may further be coupled to the credential manager 2010. The first provisioning server 2012 may facilitate provisioning of one or more credentials from the credential manager 2010 to the origination device 2002.

The system arrangement 2000 may include a second provisioning server 2014. The second provisioning server 2014 may include one or more of the features of the provisioning servers (such as the provisioning server 206, the provisioning server 218, the provisioning server 1306, and/or the provisioning server 1318) described throughout the disclosure. The second provisioning server 2014 may be coupled to the recipient device 2004. The second provisioning server 2014 may provision credentials (among other data and/or programs) to the recipient device 2004. The second provisioning server 2014 may further be coupled to the credential manager 2010. The second provisioning server 2014 may facilitate provisioning of one or more credentials from the credential manager 2010 to the recipient device 2004. For example, the second provisioning server 2014 may provision the credential shared by the origination device 2002 to the recipient device 2004, such that the recipient device 2004 may utilize the shared credential to access the secured entity.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

As described above, one aspect of the present technology is the gathering, sharing, and use of data, including an authentication tag and data from which the tag is derived. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which device ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, users may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

In some examples, "circuitry" can refer to, be part of, or include hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or," unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The specific details of particular embodiments may be combined in any suitable manner or varied from those shown and described herein without departing from the spirit and scope of embodiments of the described techniques.

The above description of exemplary embodiments of the described techniques has been presented for the purposes of illustration and description. It is not intended to be exhaustive or to limit the described techniques to the precise form described, and many modifications and variations are possible in light of the teaching above. The embodiments were chosen and described in order to best explain the principles of the described techniques and its practical applications to thereby enable others skilled in the art to best utilize the described techniques in various embodiments and with various modifications as are suited to the particular use contemplated.

All publications, patents, and patent applications cited herein are hereby incorporated by reference in their entirety for all purposes.

EXAMPLES

In the following sections, further exemplary embodiments are provided.

Example 1 may include one or more non-transitory, computer-readable media having instructions that, when executed by one or more processors of an origination device, cause the origination device to detect a user indication of a credential to be shared with a recipient device, obtain a token corresponding to the credential from a credential manager, generate a password for protection of the token, and provide the token and the password to a relay server for storage, the recipient device configured to retrieve the token from the relay server with the password.

Example 2 may include the one or more non-transitory, computer-readable media of example 1, wherein to obtain the token comprises to identify entitlements, comprising an indication of the credential, that define use limitations for the credential, and provide an indication of the entitlements to the credential manager, wherein the token is generated based at least in part on the entitlements.

Example 3 may include the one or more non-transitory, computer-readable media of example 1, wherein the instructions, when executed by the one or more processors, further cause the origination device to generate a mailbox identifier for the token, and provide the mailbox identifier to the relay server with the token and the password, the relay server configured to store the token associated with the mailbox identifier and identify the token for retrieval by the recipient device based at least in part on the mailbox identifier.

Example 4 may include the one or more non-transitory, computer-readable media of example 1, wherein the instructions, when executed by the one or more processors, further cause the origination device to encrypt the token, wherein the token provided to the relay server is the encrypted token, and wherein the relay server is unable to decode the encrypted token.

Example 5 may include the one or more non-transitory, computer-readable media of example 1, wherein the instructions, when executed by the one or more processors, further cause the origination device to detect a key provided by the recipient device, generate a signature based at least in part on the key, and provide the signature to the recipient device, the recipient device configured to use the signature for provisioning of the credential.

Example 6 may include the one or more non-transitory, computer-readable media of example 5, wherein the key comprises a public key of an asymmetric key pair generated by the recipient device, wherein the signature covers the public key.

Example 7 may include the one or more non-transitory, computer-readable media of example 1, wherein the recipient device operates a different platform than the origination device.

Example 8 may include the one or more non-transitory, computer-readable media of example 1, wherein the credential is an unclonable credential.

Example 9 may include an origination device, comprising memory configured to store a credential for access to an entity, processing circuitry coupled to the memory, the processing circuitry configured to display an indication that the credential can be shared with a recipient device, detect a user selection of the credential to be shared with the recipient device, obtain a token corresponding to the credential, and provide the token to a relay server for storage, the recipient device configured to retrieve the token from the relay server for provision of the credential.

Example 10 may include the origination device of example 9, wherein to obtain the token comprises to generate the token based at least in part on the credential.

Example 11 may include the origination device of example 10, wherein the processing circuitry is further configured to generate metadata that comprises first provisioning information associated with a first platform operated by the origination device and second provisioning information associated with a second platform operated by the recipient device, and provide the metadata to the relay server for storage with the token, the recipient device configured to retrieve the metadata for provision of the credential.

Example 12 may include the origination device of example 9, wherein the processing circuitry is configured to obtain the token from a credential manager, and wherein the processing circuitry is further configured to obtain metadata from the credential manager, and provide the metadata to the relay server for storage with the token, the recipient device configured to retrieve the metadata for provision of the credential.

Example 13 may include the origination device of example 12, wherein the metadata comprises first provisioning information associated with a first platform operated by the origination device and second provisioning information associated with a second platform operated by the recipient device.

Example 14 may include the origination device of example 9, wherein the processing circuitry is further configured to encrypt the token, wherein the token provided to the relay server is the encrypted token, and wherein the relay server is unable to decode the encrypted token.

Example 15 may include the origination device of example 9, wherein the processing circuitry is further configured to generate a password for access of the token stored on the relay server, and provide the password to the recipient device out of band.

Example 16 may include a method of obtaining a credential, comprising detecting, by a recipient device, an indication of a storage location of an encrypted token associated with the credential for providing access via the recipient device, retrieving, by the recipient device, the encrypted token from the storage location on a relay server, decrypting, by the recipient device, the encrypted token to produce a token, retrieving, by the recipient device, a sharing bundle based at least in part on the token, and utilizing, by the recipient device, the sharing bundle to provision the credential to the recipient device.

Example 17 may include the method of example 16, further comprising executing, by the recipient device, an application programming interface (API) with a provisioning server, and providing, by the recipient device via the API, the token to the provisioning server for retrieval of the sharing bundle.

Example 18 may include the method of example 16, further comprising generating, by the recipient device, an asymmetric key pair, and providing, by the recipient device, a public key of the asymmetric key pair to an origination device sharing the credential with the recipient device to retrieve a signature from the origination device.

Example 19 may include the method of example 18, further comprising detecting, by the recipient device, the signature received from the origination device, the signature allowing for provisioning of the credential to the recipient device.

Example 20 may include the method of example 16, further comprising retrieving, by the recipient device, metadata indicating the credential to be provisioned, and displaying, on a display of the recipient device, a preview of the credential based at least in part on the metadata.

Example 21 may include one or more non-transitory computer-readable media having instructions that, when executed by one or more processors of a relay server, cause the relay server to identify an encrypted payload received from an origination device, the encrypted payload being associated with a credential share operation of an access credential from the origination device to a recipient device, store the encrypted payload in a location for retrieval by the recipient device, provide a uniform resource locator (URL) associated with the location to the origination device, the uniform resource locator to be shared by the origination device with the recipient device to retrieve the encrypted payload, identify a request for the encrypted payload received from the recipient device using the uniform resource locator, and provide the encrypted payload to the recipient device based at least in part on the request, the encrypted payload to be utilized by the recipient device for retrieval of a copy of the access credential.

Example 22 may include the one or more non-transitory computer-readable media of example 21, wherein an attestation is applied to the encrypted payload, and wherein the instructions, when executed by the one or more processors, further cause the relay server to determine whether the origination device is a type of device that is authorized to share the access credential based at least in part on the attestation.

Example 23 may include the one or more non-transitory computer-readable media of example 22, wherein the attestation comprises a signature applied to the encrypted payload, and wherein the attestation indicates a device type for the origination device without identifying information for a user of the origination device.

Example 24 may include the one or more non-transitory computer-readable media of example 21, wherein an attestation is applied to the request for the encrypted payload, and wherein the instructions, when executed by the one or more processors, further cause the relay server to determine whether the recipient device is a type of device that is authorized to receive the encrypted payload based at least in part on the attestation.

Example 25 may include the one or more non-transitory computer-readable media of example 21, wherein the instructions, when executed by the one or more processors, further cause the relay server to identify an authorization policy associated with the encrypted payload indicated by the origination device, wherein the authorization policy is implemented by the relay server when sharing the encrypted payload, and apply the authorization policy to access of the location.

Example 26 may include the one or more non-transitory computer-readable media of example 21, wherein the instructions, when executed by the one or more processors, further cause the relay server to identify display information related to the access credential received from the origination device, store the display information in the location, identify a request for the display information received from the recipient device, and provide the display information to the recipient device, the display information to cause the recipient device to display an indication of the a secured entity associated with the access credential.

Example 27 may include the one or more non-transitory computer-readable media of example 26, wherein the instructions, when executed by the one or more processors, further cause the relay server to convert the display information to rich object data, wherein the display information stored in the location is the rich object data, and wherein the display information provided to the recipient device is the rich object data.

Example 28 may include the one or more non-transitory computer-readable media of example 21, wherein the instructions, when executed by the one or more processors, further cause the relay server to request a push notification be sent to the origination device that causes a user interface to be displayed on the origination device that indicates the recipient device is attempting to retrieve the copy of the access credential, wherein the encrypted payload is provided to the recipient device based at least in part on an input received at the user interface.

Example 29 may include a relay server, comprising memory to store encrypted payloads, and one or more processors coupled to the memory, the one or more processors to identify an encrypted payload received from an origination device, the encrypted payload being associated with a credential share operation of an access credential from the origination device to a recipient device, store the encrypted payload in a location of the memory for retrieval by the recipient device, provide a uniform resource locator (URL) associated with the location to the origination device, the uniform resource locator to be shared by the origination device with the recipient device to retrieve the encrypted payload, identify a request for the encrypted payload received from the recipient device using the uniform resource locator, and provide the encrypted payload to the recipient device based at least in part on the request, the encrypted payload to be utilized by the recipient device for retrieval of a copy of the access credential.

Example 30 may include the relay server of example 29, wherein an attestation is applied to the encrypted payload, and wherein one or more processors are further to determine whether the origination device is a type of device that is authorized to share the access credential based at least in part on the attestation.

Example 31 may include the relay server of example 30, wherein the attestation comprises a signature applied to the encrypted payload, and wherein the attestation indicates a device type for the origination device without identifying information for a user of the origination device.

Example 32 may include the relay server of example 29, wherein an attestation is applied to the request for the encrypted payload, and wherein the one or more processors are further to determine whether the recipient device is a type of device that is authorized to receive the encrypted payload based at least in part on the attestation.

Example 33 may include the relay server of example 29, wherein the one or more processors are further to identify display information related to the access credential received from the origination device, store the display information in the location, identify a request for the display information received from the recipient device, and provide the display information to the recipient device, the display information to cause the recipient device to display an indication of the a secured entity associated with the access credential.

Example 34 may include the relay server of example 33, wherein the one or more processors are further to convert the display information to rich object data, wherein the display information stored in the location is the rich object data, and wherein the display information provided to the recipient device is the rich object data.

Example 35 may include the relay server of example 29, wherein the one or more processors are further to request a push notification be sent to the origination device that causes a user interface to be displayed on the origination device that indicates the recipient device is attempting to retrieve the copy of the access credential, wherein the encrypted payload is provided to the recipient device based at least in part on an input received at the user interface.

Example 36 may include a method of sharing an access credential, comprising identifying, by a relay server, an encrypted payload received from an origination device, the encrypted payload being associated with a credential share operation of the access credential from the origination device to a recipient device, storing, by the relay server, the encrypted payload in a location for retrieval by the recipient device, providing, by the relay server, a uniform resource locator (URL) associated with the location to the origination device, the uniform resource locator to be shared by the origination device with the recipient device to retrieve the encrypted payload, identifying, by the relay server, a request for the encrypted payload received from the recipient device using the uniform resource locator, and providing, by the relay server, the encrypted payload to the recipient device based at least in part on the request, the encrypted payload to be utilized by the recipient device for retrieval of a copy of the access credential.

Example 37 may include the method of example 36, wherein an attestation is applied to the encrypted payload, and wherein the method further comprises determining, by the relay server, whether the origination device is a type of device that is authorized to share the access credential based at least in part on the attestation.

Example 38 may include the method of example 37, wherein the attestation comprises a signature applied to the encrypted payload, and wherein the attestation indicates a device type for the origination device without identifying information for a user of the origination device.

Example 39 may include the method of example 36, wherein an attestation is applied to the request for the encrypted payload, and wherein the method further comprises determining, by the relay server, whether the recipient device is a type of device that is authorized to receive the encrypted payload based at least in part on the attestation.

Example 40 may include the method of example 36, further comprising requesting, by the relay server, a push notification be sent to the origination device that causes a user interface to be displayed on the origination device that indicates the recipient device is attempting to retrieve the copy of the access credential, wherein the encrypted payload is provided to the recipient device based at least in part on an input received at the user interface.

Example 41 may include one or more non-transitory computer-readable media having instructions that, when executed by one or more processors of a system, cause the system to identify an indication to share an access credential with a recipient device, generate an encrypted payload to be utilized by the recipient device to retrieve a copy of the access credential, provide a uniform resource locator (URL) associated with a storage location for the encrypted payload to the recipient device, identify a request for the encrypted payload received from the recipient device via the uniform resource locator, and provide the encrypted payload to the recipient device based at least in part on the request.

Example 42 may include the one or more non-transitory computer-readable media of example 41, wherein an attestation is applied to the request for the encrypted payload, and wherein the instructions, when executed by the one or more processors, further cause the system to determine whether the recipient device is a type of device that is authorized to receive the encrypted payload based at least in part on the attestation.

Example 43 may include the one or more non-transitory computer-readable media of example 42, wherein the attestation comprises a signature applied to the request for the encrypted payload, and wherein the attestation indicates a device type for the recipient device without identifying information for a user of the recipient device.

Example 44 may include the one or more non-transitory computer-readable media of example 41, wherein the instructions, when executed by the one or more processors, further cause the system to display a user interface associated with a push notification received by the system, wherein the user interface indicates that the recipient device is attempting to retrieve the copy of the access credential.

Example 45 may include the one or more non-transitory computer-readable media of example 44, wherein the instructions, when executed by the one or more processors, further cause the system to detect an input entered in the user interface, wherein the encrypted payload is provided to the recipient device based at least in part on the input entered in the user interface.

Example 46 may include the one or more non-transitory computer-readable media of example 41, wherein the instructions, when executed by the one or more processors, further cause the system to display one or more access credentials that are shareable by the system, wherein to identify the indication to share the access credential comprises to identify a selection of the access credential from the one or more access credentials displayed.

Example 47 may include the one or more non-transitory computer-readable media of example 41, wherein the instructions, when executed by the one or more processors, further cause the system to identify an indication of one or more limitations for the copy of the access credential, wherein the one or more limitations limits use of the copy of the access credential by the recipient device.

Example 48 may include the one or more non-transitory computer-readable media of example 41, wherein the instructions, when executed by the one or more processors, further cause the system to generate rich object data that is to cause display of an indication of a secured entity associated with the access credential, and provide the rich object data to the recipient device based at least in part on the identification of the request for the encrypted payload, wherein the rich object data is to cause the indication of the secured entity to be displayed on the recipient device.

Example 49 may include a system, comprising memory to store one or more encrypted payloads, and one or more processors coupled to the memory, the one or more processors to identify an indication to share an access credential with a recipient device, generate an encrypted payload to be utilized by the recipient device to retrieve a copy of the access credential, provide a uniform resource locator (URL) associated with a storage location for the encrypted payload to the recipient device, identify a request for the encrypted payload received from the recipient device via the uniform resource locator, and provide the encrypted payload to the recipient device based at least in part on the request.

Example 50 may include the system of example 49, wherein an attestation is applied to the request for the encrypted payload, and wherein the one or more processors are further to determine whether the recipient device is a type of device that is authorized to receive the encrypted payload based at least in part on the attestation.

Example 51 may include the system of example 50, wherein the attestation comprises a signature applied to the request for the encrypted payload, and wherein the attestation indicates a device type for the recipient device without identifying information for a user of the recipient device.

Example 52 may include the system of example 49, wherein the one or more processors are further to display a user interface associated with a push notification received by the system, wherein the user interface indicates that the recipient device is attempting to retrieve the copy of the access credential.

Example 53 may include the system of example 52, wherein the one or more processors are further to detect an input entered in the user interface, wherein the encrypted payload is provided to the recipient device based at least in part on the input entered in the user interface.

Example 54 may include the system of example 49, wherein the one or more processors are further to display one or more access credentials that are shareable by the system, wherein to identify the indication to share the access credential comprises to identify a selection of the access credential from the one or more access credentials displayed.

Example 55 may include the system of example 49, wherein the one or more processors are further to identify an indication of one or more limitations for the copy of the access credential, wherein the one or more limitations limits use of the copy of the access credential by the recipient device.

Example 56 may include the system of example 49, wherein the one or more processors are further to generate rich object data that is to cause display of an indication of a secured entity associated with the access credential, and provide the rich object data to the recipient device based at least in part on the identification of the request for the encrypted payload, wherein the rich object data is to cause the indication of the secured entity to be displayed on the recipient device.

Example 57 may include a method of sharing an access credential, comprising identifying, by a system, an indication to share the access credential with a recipient device, generating, by the system, an encrypted payload to be utilized by the recipient device to retrieve a copy of the access credential, providing, by the system, a uniform resource locator (URL) associated with a storage location for the encrypted payload to the recipient device, identifying, by the system, a request for the encrypted payload received from the recipient device via the uniform resource locator, and providing, by the system the encrypted payload to the recipient device based at least in part on the request.

Example 58 may include the method of example 57, wherein an attestation is applied to the request for the encrypted payload, and wherein the method further comprises determining, by the system, whether the recipient device is a type of device that is authorized to receive the encrypted payload based at least in part on the attestation.

Example 59 may include the method of example 58, wherein the attestation comprises a signature applied to the request for the encrypted payload, and wherein the attestation indicates a device type for the recipient device without identifying information for a user of the recipient device.

Example 60 may include the method of example 57, further comprising displaying, by the system, a user interface associated with a push notification received by the system, wherein the user interface indicates that the recipient device is attempting to retrieve the copy of the access credential.

Example 61 may include an apparatus comprising means to perform one or more elements of a method described in or related to any of examples 1-60, or any other method or process described herein.

Example 62 may include one or more non-transitory computer-readable media comprising instructions to cause an electronic device, upon execution of the instructions by one or more processors of the electronic device, to perform one or more elements of a method described in or related to any of examples 1-60, or any other method or process described herein.

Example 63 may include an apparatus comprising logic, modules, or circuitry to perform one or more elements of a method described in or related to any of examples 1-60, or any other method or process described herein.

Example 64 may include a method, technique, or process as described in or related to any of examples 1-60, or portions or parts thereof.

Example 65 may include an apparatus comprising: one or more processors and one or more computer-readable media comprising instructions that, when executed by the one or more processors, cause the one or more processors to perform the method, techniques, or process as described in or related to any of examples 1-60, or portions thereof.

Example 66 may include a signal as described in or related to any of examples 1-60, or portions or parts thereof.

Example 67 may include a datagram, information element, packet, frame, segment, PDU, or message as described in or related to any of examples 1-60, or portions or parts thereof, or otherwise described in the present disclosure.

Example 68 may include a signal encoded with data as described in or related to any of examples 1-60, or portions or parts thereof, or otherwise described in the present disclosure.

Example 69 may include a signal encoded with a datagram, IE, packet, frame, segment, PDU, or message as described in or related to any of examples 1-60, or portions or parts thereof, or otherwise described in the present disclosure.

Example 70 may include an electromagnetic signal carrying computer-readable instructions, wherein execution of the computer-readable instructions by one or more processors is to cause the one or more processors to perform the method, techniques, or process as described in or related to any of examples 1-60, or portions thereof.

Example 71 may include a computer program comprising instructions, wherein execution of the program by a processing element is to cause the processing element to carry out the method, techniques, or process as described in or related to any of examples 1-60, or portions thereof.

Example 72 may include a signal in a wireless network as shown and described herein.

Example 73 may include a method of communicating in a wireless network as shown and described herein.

Example 74 may include a system for providing wireless communication as shown and described herein.

Example 75 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors of a system, cause the system to:
   identify an indication to share an access credential with a recipient device;
   generate an encrypted payload to be utilized by the recipient device to retrieve a copy of the access credential, the encrypted payload comprising an encrypted token;
   provide a uniform resource locator (URL) associated with a storage location for the encrypted payload to the recipient device;
   identify a request for the encrypted payload received from the recipient device via the uniform resource locator;
   determine that the recipient device is executing a different platform from an origination device sharing the access credential;
   convert the encrypted token for the different platform based at least in part on the determination that the recipient device is executing the different platform; and
   provide the encrypted payload to the recipient device based at least in part on the request.

2. The one or more non-transitory computer-readable media of claim 1, wherein an attestation is applied to the request for the encrypted payload, and wherein the instructions, when executed by the one or more processors, further cause the system to:
   determine whether the recipient device is a type of device that is authorized to receive the encrypted payload based at least in part on the attestation.

3. The one or more non-transitory computer-readable media of claim 2, wherein the attestation comprises a signature applied to the request for the encrypted payload, and wherein the attestation indicates a device type for the recipient device without identifying information for a user of the recipient device.

4. The one or more non-transitory computer-readable media of claim 1, wherein the instructions, when executed by the one or more processors, further cause the system to:
   display a user interface associated with a push notification received by the system, wherein the user interface indicates that the recipient device is attempting to retrieve the copy of the access credential.

5. The one or more non-transitory computer-readable media of claim 1, wherein the instructions, when executed by the one or more processors, further cause the system to:
   display one or more access credentials that are shareable by the system, wherein to identify the indication to share the access credential comprises to identify a selection of the access credential from the one or more access credentials displayed.

6. The one or more non-transitory computer-readable media of claim 1, wherein the instructions, when executed by the one or more processors, further cause the system to:
   identify an indication of one or more limitations for the copy of the access credential, wherein the one or more limitations limits use of the copy of the access credential by the recipient device.

7. The one or more non-transitory computer-readable media of claim 1, wherein the instructions, when executed by the one or more processors, further cause the system to:
   generate rich object data that is to cause display of an indication of a secured entity associated with the access credential; and
   provide the rich object data to the recipient device based at least in part on the identification of the request for the encrypted payload, wherein the rich object data is to cause the indication of the secured entity to be displayed on the recipient device.

8. The one or more non-transitory computer-readable media of claim 1, wherein the instructions, when executed by the one or more processors, further cause the system to:
   generate the copy of the access credential for the recipient device, the copy of the access credential generated for execution on the different platform.

9. A system, comprising:
   memory to store one or more encrypted payloads; and
   one or more processors coupled to the memory, the one or more processors to:
   identify an indication to share an access credential with a recipient device;
   generate an encrypted payload to be utilized by the recipient device to retrieve a copy of the access credential, the encrypted payload comprising an encrypted token;
   provide a uniform resource locator (URL) associated with a storage location for the encrypted payload to the recipient device;
   identify a request for the encrypted payload received from the recipient device via the uniform resource locator;
   determine that the recipient device is executing a different platform from an origination device sharing the access credential;
   convert the encrypted token for the different platform based at least in part on the determination that the recipient device is executing the different platform; and
   provide the encrypted payload to the recipient device based at least in part on the request.

10. The system of claim 9, wherein an attestation is applied to the request for the encrypted payload, and wherein the one or more processors are further to:
    determine whether the recipient device is a type of device that is authorized to receive the encrypted payload based at least in part on the attestation.

11. The system of claim 10, wherein the attestation comprises a signature applied to the request for the encrypted payload, and wherein the attestation indicates a device type for the recipient device without identifying information for a user of the recipient device.

12. The system of claim 9, wherein the one or more processors are further to:
    display a user interface associated with a push notification received by the system, wherein the user interface indicates that the recipient device is attempting to retrieve the copy of the access credential.

13. The system of claim 12, wherein the one or more processors are further to:
    detect an input entered in the user interface, wherein the encrypted payload is provided to the recipient device based at least in part on the input entered in the user interface.

14. The system of claim 9, wherein the one or more processors are further to:
- display one or more access credentials that are shareable by the system, wherein to identify the indication to share the access credential comprises to identify a selection of the access credential from the one or more access credentials displayed.

15. The system of claim 9, wherein the one or more processors are further to:
- identify an indication of one or more limitations for the copy of the access credential, wherein the one or more limitations limits use of the copy of the access credential by the recipient device.

16. The system of claim 9, wherein the one or more processors are further to:
- generate rich object data that is to cause display of an indication of a secured entity associated with the access credential; and
- provide the rich object data to the recipient device based at least in part on the identification of the request for the encrypted payload, wherein the rich object data is to cause the indication of the secured entity to be displayed on the recipient device.

17. A method of sharing an access credential, comprising:
- identifying, by a system, an indication to share the access credential with a recipient device;
- generating, by the system, an encrypted payload to be utilized by the recipient device to retrieve a copy of the access credential, the encrypted payload comprising an encrypted token;
- providing, by the system, a uniform resource locator (URL) associated with a storage location for the encrypted payload to the recipient device;
- identifying, by the system, a request for the encrypted payload received from the recipient device via the uniform resource locator;
- determining that the recipient device is executing a different platform from an origination device sharing the access credential;
- converting the encrypted token for the different platform based at least in part on the determination that the recipient device is executing the different platform; and
- providing, by the system the encrypted payload to the recipient device based at least in part on the request.

18. The method of claim 17, wherein an attestation is applied to the request for the encrypted payload, and wherein the method further comprises:
- determining, by the system, whether the recipient device is a type of device that is authorized to receive the encrypted payload based at least in part on the attestation.

19. The method of claim 18, wherein the attestation comprises a signature applied to the request for the encrypted payload, and wherein the attestation indicates a device type for the recipient device without identifying information for a user of the recipient device.

20. The method of claim 17, further comprising:
- displaying, by the system, a user interface associated with a push notification received by the system, wherein the user interface indicates that the recipient device is attempting to retrieve the copy of the access credential.

\* \* \* \* \*